United States Patent
Kim et al.

(10) Patent No.: US 7,376,424 B2
(45) Date of Patent: May 20, 2008

(54) METHOD FOR SEAMLESS INTER-FREQUENCY HARD HANDOVER IN RADIO COMMUNICATION SYSTEM

(75) Inventors: Il-Gyu Kim, Seoul (KR); Seung-Chan Bang, Taejon (KR); Jae-Heung Kim, Taejon (KR); Chang-Joo Kim, Taejon (KR)

(73) Assignee: Electronics and Telecommunications Research Institute (KR)

( * ) Notice: Subject to any disclaimer, the term of this patent is extended or adjusted under 35 U.S.C. 154(b) by 106 days.

(21) Appl. No.: 10/466,053

(22) PCT Filed: Dec. 31, 2001

(86) PCT No.: PCT/KR01/02314

§ 371 (c)(1),
(2), (4) Date: Jul. 9, 2003

(87) PCT Pub. No.: WO02/058280

PCT Pub. Date: Jul. 25, 2002

(65) Prior Publication Data

US 2004/0053614 A1    Mar. 18, 2004

(30) Foreign Application Priority Data

Jan. 10, 2001    (KR) .................. 2001-1435

(51) Int. Cl.
*H04Q 7/20* (2006.01)
*H04Q 7/00* (2006.01)

(52) U.S. Cl. ........................ 455/436; 370/331

(58) Field of Classification Search ........... 455/436, 455/438, 439, 437; 370/331, 335
See application file for complete search history.

(56) References Cited

U.S. PATENT DOCUMENTS 5,729,826 A    3/1998    Gavrilovich
6,212,368 B1    4/2001    Ramesh et al.

(Continued)

FOREIGN PATENT DOCUMENTS

WO    WO 99/57849    11/1999

OTHER PUBLICATIONS

Mobile and personal Communications, Dec. 13-15, 1993, Conference Publication No. 387, pp. 255-260.

(Continued)

*Primary Examiner*—William Trost
*Assistant Examiner*—Marivelisse Santiago-Cordero
(74) *Attorney, Agent, or Firm*—Blakely Sokoloff Taylor & Zafman

(57) ABSTRACT

A method for seamless inter-frequency hard handover in a radio communication system is disclosed. The method for seamless inter-frequency hard handover includes the steps of: a) at a mobile station, blocking a first uplink carrier frequency used for communication, transmitting a direct sequence spread preamable signal through a second uplink carrier frequency for a short time, and continuously performing the communication through the first uplink carrier frequency: and h) at a target base transciever station, acquiring an uplink synchronization of a mobile station based on the preamble before performing handover.

26 Claims, 16 Drawing Sheets

U.S. PATENT DOCUMENTS

| | | | |
|---|---|---|---|
| 6,359,876 B1* | 2/2002 | Kamata | 370/342 |
| 6,556,585 B1* | 4/2003 | Moulsley | 370/465 |
| 6,563,807 B1* | 5/2003 | Kim et al. | 455/436 |
| 6,597,679 B1* | 7/2003 | Willars | 455/436 |
| 6,611,507 B1* | 8/2003 | Teittinen et al. | 370/331 |
| 6,667,961 B1* | 12/2003 | Park et al. | 455/436 |
| 6,810,019 B2* | 10/2004 | Steudle | 370/252 |
| 6,831,910 B1* | 12/2004 | Moon et al. | 370/342 |
| 6,868,075 B1* | 3/2005 | Narvinger et al. | 370/335 |
| 2001/0008521 A1* | 7/2001 | Virtanen | 370/331 |
| 2001/0046240 A1* | 11/2001 | Longoni et al. | 370/503 |
| 2002/0045448 A1* | 4/2002 | Park et al. | 455/436 |
| 2002/0071480 A1* | 6/2002 | Marjelund et al. | 375/141 |
| 2003/0118057 A1* | 6/2003 | Ushirokawa et al. | 370/522 |
| 2004/0017777 A1* | 1/2004 | Chaudhuri et al. | 370/241 |
| 2004/0258020 A1* | 12/2004 | Hayata | 370/331 |

OTHER PUBLICATIONS

CDMA Packet Transmission Control in the Third Generation Mobile Communications Systems, 0-7803-4872-9/98, 1998 IEEE, pp. 178-182, no month listed.

Forward-link Power Control Utilizing Neighboring-cell Pilot Power for DS-CDMA Cellular Systems, 0-7803-3659-3/97, 1997 IEEE, pp. 939-943, no month listed.

3GPP TS 25.212, Multiplexing and Channel Coding (FDD); Version 1.0.0, Apr. 23, 1999.

3GPP TS 25.212, Multiplexing and Channel Coding (FDD); Version 2.0.0, Jun. 23, 1999.

3GPP TS 25.212, Multiplexing and Channel Coding (FDD); Version 3.0.0, Oct. 13, 1999.

3GPP TS 25.212, Multiplexing and Channel Coding (FDD); Version 3.1.0, Dec. 12, 1999.

3GPP TS 25.212, Multiplexing and Channel Coding (FDD); Version 3.1.1, Jan. 15, 2000.

3GPP TS 25.212, Multiplexing and Channel Coding (FDD); Version 3.2.0, Mar. 15, 2000.

3GPP TS 25.212, Multiplexing and Channel Coding (FDD); Version 3.3.0, Jun. 23, 2000.

3GPP TS 25.212, Multiplexing and Channel Coding (FDD); Version 3.4.0, Oct. 18, 2000.

3GPP TS 25.212, Multiplexing and Channel Coding (FDD); Version 3.5.0, Dec. 22, 2000.

3GPP TS 25.331, Radio Resource Control (RRC); Version 1.0.0, Mar. 4, 1999.

3GPP TS 25.331, Radio Resource Control (RRC); Version 1.1.0, Jun. 23, 1999.

3GPP TS 25.331, Radio Resource Control (RRC); Version 3.0.0, Oct. 13, 1999.

3GPP TS 25.331, Radio Resource Control (RRC); Version 3.1.0, Dec. 12, 1999.

3GPP TS 25.331, Radio Resource Control (RRC); Version 3.2.0, Mar. 15, 2000.

3GPP TS 25.331, Radio Resource Control (RRC); Version 3.3.0, Jun. 23, 2000.

3GPP TS 25.331, Radio Resource Control (RRC); Version 3.4.0, Oct. 6, 2000.

3GPP TS 25.331, Radio Resource Control (RRC); Version 3.4.1, Oct. 6, 2000.

3GPP TS 25.331, Radio Resource Control (RRC); Version 3.5.0, Dec. 21, 2000.

3GPP TS 25.303, Interlayer Procedures in Connected Mode; Version 2.0.0, Apr. 23, 1999.

3GPP TS 25.303, Interlayer Procedures in Connected Mode; Version 3.0.0, Jun. 23, 1999.

3GPP TS 25.303, Interlayer Procedures in Connected Mode; Version 3.1.0, Oct. 13, 1999.

3GPP TS 25.303, Interlayer Procedures in Connected Mode; Version 3.2.0, Dec. 12, 1999.

3GPP TS 25.303, Interlayer Procedures in Connected Mode; Version 3.4.0, Jun. 23, 2000.

3GPP TS 25.303, Interlayer Procedures in Connected Mode; Version 3.5.0, Oct. 16, 2000.

3GPP TS 25.303, Interlayer Procedures in Connected Mode; Version 3.6.0, Dec. 20, 2000.

* cited by examiner

METHOD FOR SEAMLESS INTER-FREQUENCY HARD HANDOVER IN RADIO COMMUNICATION SYSTEM The present patent application is a non-provisional application of International Application No. PCT/KR01/02314, filed Dec. 31, 2001.

TECHNICAL FIELD

The present invention relates to a handover method in a radio communication system; and, more particularly, to a method capable of implementing a seamless inter-frequency hard handover in a direct sequence code division multiple access (DS-CDMA) system and a computer readable recording medium for executing the method.

BACKGROUND ART

It is widely known that a soft handover, in which a frequency change does not occur, can be used generally for handover between base stations of one wireless communication service provider in a CDMA cellular system since all base stations of the one wireless communication service provider can use a same frequency for the soft handover.

The soft handover is a method for maintaining a communication link by simultaneously transceiving communication signal with both a source base station and a neighbor base station without changing a communication frequency when a mobile station is located at a cell boundary of the two base stations, i.e., when the mobile station moves from a coverage of the source base station to a coverage of the neighbor base station, and then disconnecting the communication link with the source base station, if a signal intensity of the source base station is weaken below a standard signal intensity as maintaining continuously the communication link with the neighbor base station. The above-mentioned soft handover provides the unstrained handover by eliminating an instant-disconnection, which is a chronic problem of an analog system, decreases a probability of call loss and maintains high quality communication.

However, the soft handover is not applicable in case a certain wireless communication service provider allocates different number of frequencies to the neighbor base stations according to a call density by considering an economy of a network design and an efficiency of investment, i.e., the neighbor base stations use different frequencies. That is, if the mobile station using a specific frequency of the source base station is moving to the cell of the neighbor base station, which does not equip the specific frequency, the soft handover cannot be applicable. Furthermore, the soft handover cannot be applicable between base stations possessed by two wireless communication providers using different frequencies although they adopt the same CDMA scheme. For these cases, the hardware handover has to be used.

The hard handover needs to be performed between frequencies in case of the handover from a wideband-CDMA (W-CDMA) time division duplex (TDD) to a W-CDMA frequency division duplex (FDD) or handover from global system for mobile communications (GSM) to the W-CDMA FDD.

Referring to FIG. 1, an example of the hard handover between a source base station 2 and a target base station 3 is explained as follows.

As shown in FIG. 1, the target base station 3 does not support communication frequencies $f_1$ and $f_1'$ of a current mobile station 1.

In FIG. 1, in case of the mobile station 1 having a dual-mode receiver, the mobile station 1 can measure a signal intensity of a new frequency $f_2$ while demodulating downlink signals through the currently established frequency $f_1$ and acquire synchronization of signals transmitted from the target base station 3.

Such the dual-mode receiver needs an additional hardware for radio frequency (RF) compared to a single-mode receiver and thus the complexity of a mobile device is increased.

To overcome above-mentioned problems, a compressed mode is defined in an asynchronous W-CDMA (FDD) standard (Release '99) of $3^{rd}$ generation partnership project (3GPP), which was released at September 2000.

FIG. 2 illustrates an example of compressed mode transmission.

In the 3GPP standard, a frame has a length of 10 msec and consists of 15 slots.

For a transmission gap (TG) region 7 in a compressed frame, data transmission is not permitted. Instead of permitting the data transmission, a rate of frame errors of the compressed frame is maintained identical to that of a normal frame 5 by keeping a transmitting power at a slot region 6 in the compressed frame higher than a power of the normal frame 5.

The mobile station 1 having the single-mode receiver can search the signal intensity of the new frequency $f_2$ in downlink on the handover situation shown in FIG. 1 by using the compressed mode of FIG. 2. That is, it is possible to search the signal intensity by dropping the current established communication frequency $f_1$, changing to a frequency $f_2$ and measuring the signal intensity of $f_2$ in the TG region and after the TG region is over, demodulating the call channel of the frequency $f_1$.

In the 3GPP (FDD) standard, the compressed mode is defined at not only the downlink but also the uplink. The downlink and uplink can be operated simultaneously as the compressed mode and only one of the downlink and the uplink can be operated as the compressed mode. A reason of defining the compressed mode in the uplink is for prevention of interference to the downlink when the mobile station 1 measures a frequency of the uplink and the downlink of a neighbor system such as 3GPP TDD or GSM. Therefore, even though the mobile station 1 employs the dual-mode receiver, the uplink needs to be operated as the compressed mode in case that the mobile station 1 measures the downlink of other system using a frequency similar to the frequency of the uplink.

In shortly, it is possible that the mobile station 1, which satisfies the 3GPP (FDD) standard, monitors a new frequency $f_2$ of the downlink before disconnecting the current established call channel completely in the handover situation in FIG. 1 and call disconnection of the downlink can be avoided although there occurs the hard handover to the new frequency $f_2$ since the synchronization of the downlink transmitted from the target base station 3 can be acquired by using a synchronization channel of $f_2$ and a common pilot channel.

On the other hand, in case of the uplink, since the target base station receives no signal before the mobile station 1 drops the current established frequency $f_1'$ and transmits signals by using a new frequency $f_2'$, i.e., the hard handover occurs, the synchronization of the uplink needs to be started at the target base station 3 from a moment that the hard handover occurs. There occurs call disconnection since at least one frame is required to acquire the synchronization of the uplink even if an outperformed searcher is used in the target base station 3.

Moreover, since, according to the 3GPP W-CDMA (FDD) scheme, corresponding base stations operate in asynchronization, the target base station 3 cannot detect a round trip delay between the mobile station 1 and the target base station 3 and therefore, a time for acquiring synchronization in the target base station 3 may be more than several frames since a search window size becomes very large, which a searcher has to search, in case that a coverage area of the base station is huge. In this case, several frame disconnection may happen and current call disconnection also may be happened in more serious case. Also, in this case, a power may not be controlled properly, so that a capacity of the uplink of the target base station 3 may be incredibly decreased.

In the 3 GPP W-CDMA standard (Release'99), it is possible to perform the handover only in case a difference between a system frame number (SFN) of the target base station 3 and a connection frame number (CFN) of the mobile station 1 is known to the network. Therefore, the mobile station 1 needs to detect the SFN information of the target base station 3 by demodulating a common channel of the downlink of the target base station 3 before performing the handover and transmit the SFN information and a frame offset, which is the difference between the CFN of the mobile station 1, to the base station controller 4. Thereby allowing the base station controller 4 to decide an exact handover time, resulting in performing the handover. Abovementioned operations are well performed in the soft handover between same frequencies. However, in case of the hard handover between different frequencies, the mobile station 1 should use the compressed mode of the downlink for acquiring the SFN information of the target base station 3.

However, in the standard (Release'99), it is impossible to acquire the SFN information by using the compressed mode since at least 50 msec continuous demodulating time is required in the downlink for acquiring the SFN information. In case of the hard handover, since the mobile station 1 has to acquire the SFN information after being completely disconnected with the current established frequency and being connected to a new frequency, there may occur at least 50 msec additional call disconnection.

The above-mentioned problems are not limited to the inter-frequency hard handover in the W-CDMA FDD and they may happen when a multimode device having the dual-mode receiver or the single-mode receiver such as GSM/WCDMA FDD multimode device or W-CDMA TDD/W-CDMA FDD multimode device performs the hard handover from the GSM system to the W-CDMA FDD system or from the W-CDMA TDD system to the W-CDMA FDD system.

As mentioned above, the disconnection is inevitable for performing the inter-frequency hard handover defined in the 3GPP W-CDMA FDD standard. Specially, in case of the mobile station having the single mode receiver, since the compressed mode is used in the downlink for searching signals of the target base station so the frame offset between the target base station and the mobile station is not known to the network. In this case, the disconnection problem becomes more serious since at least 50 msec disconnection is generated during performing the inter-frequency handover. This is indicated as a problem in the 3GPP. Therefore, a handover method, which performs the inter-frequency hard handover without disconnection, is required for addressing the problems in the asynchronous W-CDMA standard.

DISCLOSURE OF THE INVENTION

It is, therefore, an object of the present invention to provide a method capable of implementing a seamless inter-frequency hard handover in a wireless communication system such as a DS-CDMA system and a computer readable recording medium storing instructions for executing the method.

In accordance with an aspect of the present invention, there is provided a method for performing seamless inter-frequency hard handover in a radio communication system, including the steps of: a) a mobile station, disconnecting a first uplink carrier frequency used for communication, transmitting a direct sequence spread preamble signal through a second uplink carrier frequency for a short time, and continuously performing the communication through the first uplink carrier frequency; b) a target base station, acquiring an uplink synchronization of the mobile station by using the direct sequence spread preamble; and c) performing the hard handover by using the uplink synchronization.

In accordance with another aspect of the present invention, there is also provided a method for performing a seamless inter-frequency hard handover in a radio communication system in case that a base station controller (or a radio network) does not know a frame offset, which is a difference between a connection frame number (CFN) of a mobile station and a system frame number (SFN) of a target base station, including the steps of: a) the mobile station, completely disconnecting a first uplink carrier frequency used for communication, transmitting a direct sequence spread preamble (or pilot) through a second uplink carrier frequency for a short time, and continuously performing the communication through the first uplink carrier frequency; b) the target base station, acquiring an uplink synchronization of the mobile station by using the preamble before performing the hard handover; c) the target base station, after acquiring the uplink synchronization, transmitting a direct sequence spread AI as a response for the acquisition of the uplink synchronization for a short time through a new downlink frequency; d) the mobile station, detecting the acquisition indicator (AI); e) the base station controller, calculating a frame offset by using the SFN, which is used for transmitting the AI and the CFN, which is used for receiving the AI, and transmitting the calculated frame offset to the target base station; and f) the base station controller, instructing the mobile station and the target base station to perform the handover.

The present invention transmits a preamble (or a pilot) through new frequency $f_2'$ in a transmission gap (TG) by using an uplink compressed mode before a mobile station completely disconnects a currently established communication in an inter-frequency hard handover situation described in FIG. 1.

The present invention provides a method for seamless inter-frequency hard handover by acquainting a synchronization of an uplink by using a preamble (or pilot) transmitted from a target base station before a currently established communication is completely disconnected.

In the present invention, the target base station transmits an acquisition indicator (AI) through downlink for a fast response of acquisition of the preamble (or pilot) transmitted from a mobile station in the transmission gap (TG).

The present invention also prevents an additional call disconnection in case a base station controller does not know a frame offset, which is a difference between SFN of the target base station and CFN of the mobile station, by providing a method that a network knows the frame offset before performing the hard handover.

In a difference way of a convention inter-frequency hard handover having problem of at least more than one frame call disconnection, the present invention provides a method for seamless inter-frequency hard handover by transmitting a preamble (or pilot) through new frequency with a compressed mode, acquainting a synchronization of an uplink by using a preamble (or pilot) transmitted from a target base station before a currently established communication is completely disconnected.

The present invention also performs the hard handover quickly in a network by the target base station transmits the acquisition indicator (AI) according to a received preamble (or pilot) transmitted from a mobile station in a transmission gap (TG).

In a difference way of a convention inter-frequency hard handover having problem of at least more than 50 msec call disconnection in case that a base station controller dose not know a frame offset, which is a difference between SFN of a target base station and CFN of a mobile station, the present invention provides a method for seamless inter-frequency hard handover by providing a method that a network knows the frame offset before performing the hard handover.

The present invention can be implemented to not only an inter-frequency hard handover in W-CDMA FDD system but also a hard handover to W-CDMA FDD or from GSM to W-CDMA FDD in W-CDMA TDD system.

BRIEF DESCRIPTION OF THE DRAWINGS

The above and other objects and features of the present invention will become apparent from the following description of the preferred embodiments given in conjunction with the accompanying drawings, in which.

MODES FOR CARRYING OUT THE INVENTION

With reference to the accompanying drawings, the preferred embodiments of the present invention will be described in detail hereinafter.

Figure 1:
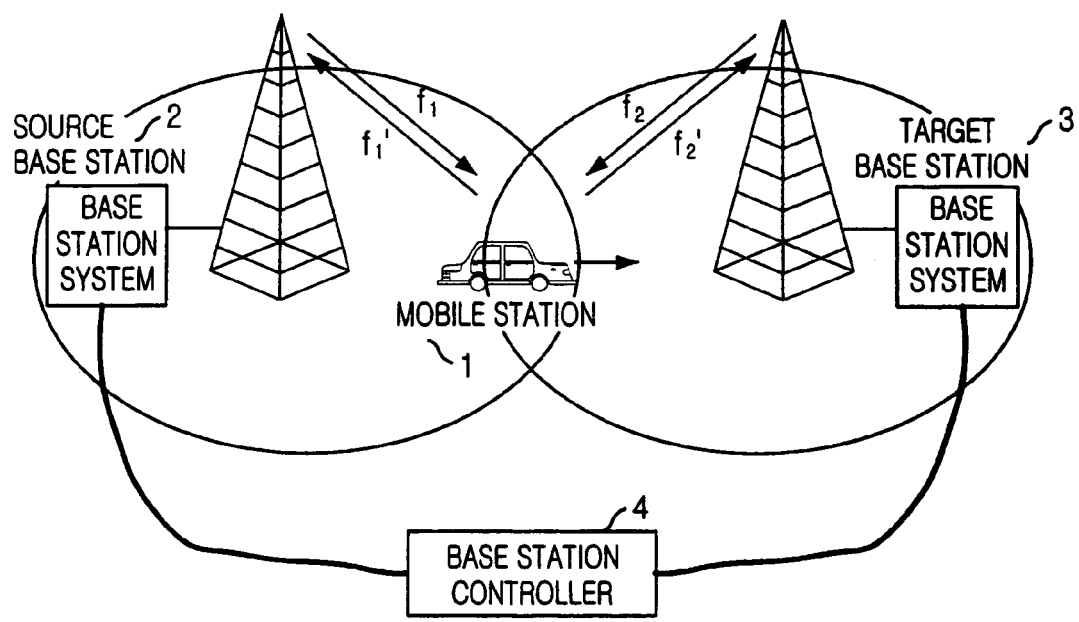
FIG. 1 is a view illustrating a typical wireless communication system for performing an inter-frequency hard handover.
Figure 2:
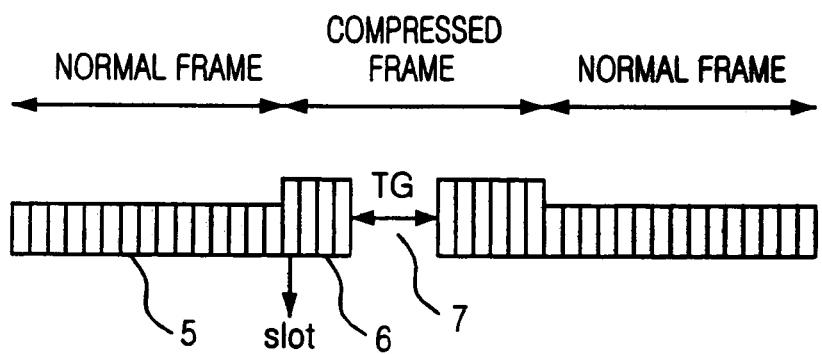
FIG. 2 is a diagram showing a structure of a typical compressed mode transmission.

FIG. 1 shows an example of performing a hard handover between two base stations, i.e., a source base station 2 and a target base station 3. As shown in FIG. 1, the target base station 3 does not support communication frequencies $f_1$ and $f_1'$ of a mobile station 1.

Figure 3:
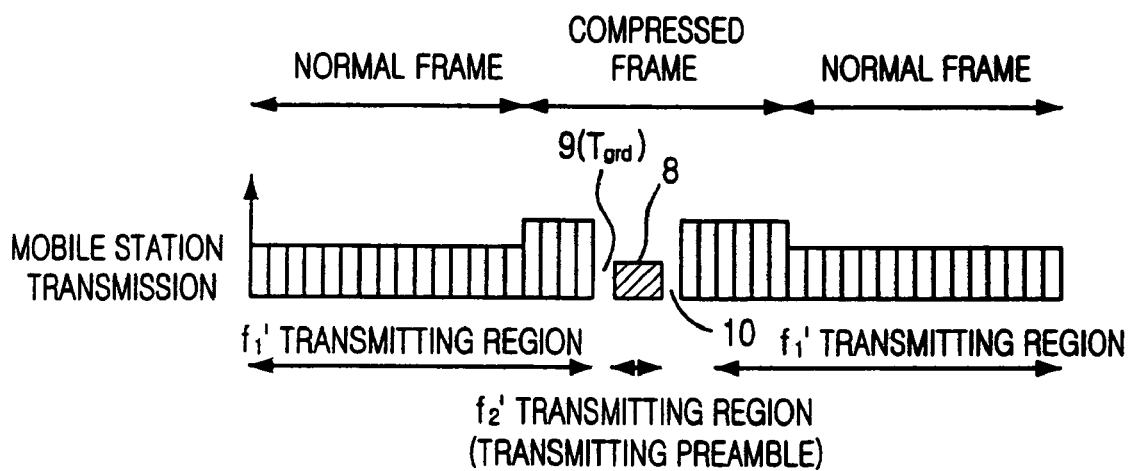
FIG. 3 is a diagram depicting an example of an uplink transmission, which transmits a preamble through a new frequency by using a compressed mode of a single frame configuration for a seamless inter-frequency hard handover in accordance with an embodiment of the present invention.
Figure 4:
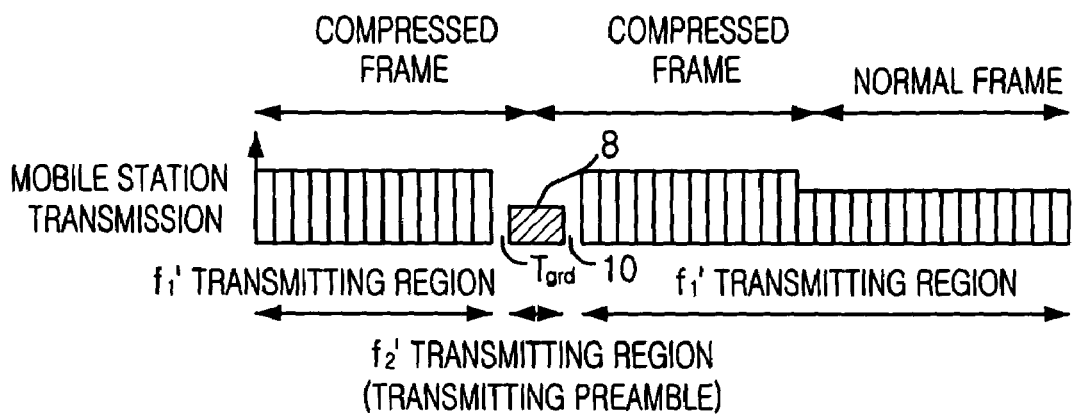
FIG. 4 is a diagram providing an example of an uplink transmission, which transmits a preamble through a new frequency by using a compressed mode of a double frame configuration for a seamless inter-frequency hard handover in accordance with an embodiment of the present invention.

FIGS. 3 and 4 exemplify preamble transmission methods of an uplink, which use an uplink compression mode of the present invention for implementing a seamless inter-frequency hard handover in a same situation is in FIG. 1. FIG. 3 shows a single frame compression mode and FIG. 4 represents a double frame compression mode.

In the present invention, the mobile station 1 transmits a preamble 8 through a new frequency $f_2'$ in a TG region by using the uplink compressed mode before disconnecting the current established frequency $f_1'$ completely as shown in FIGS. 3 and 4. At this moment, the preamble 8 transmitted from the mobile station 1 is a direct sequence bandwidth spread signal and a code sequence used for bandwidth spread needs to be known to the target base station 3 before the preamble is transmitted.

For seamless inter-frequency hard handover, before performing the hard handover, the target base station 3 acquires the synchronization of signals transmitted from the mobile station 1 by using the preamble 8 of the uplink at which the mobile station 1 transmits signals through the new frequency $f_2'$ by using the uplink compressed mode.

In the present invention, the mobile station 1 has "Guard Time" before 9 or after 10 transmitting the preamble 8 in the uplink compressed mode, and the target base station 3 and a base station controller 4, i.e., a network should know the "Guard Time" ($T_{grd}$) 9 before the preamble 8 transmitted. This has to be newly defined in the 3GPP standard.

In the present invention, after the target base station 3 acquires the synchronization of signal transmitted from the mobile station 1 by using the preamble 8 of the uplink transmitted through the frequency $f_2'$, the target base station 3 can transmit an acknowledgment (ACK) of acquiring the synchronization (through a wired network) to the base station controller 4 or through the downlink of the frequency $f_2$ to the mobile station 1.

Figure 5:
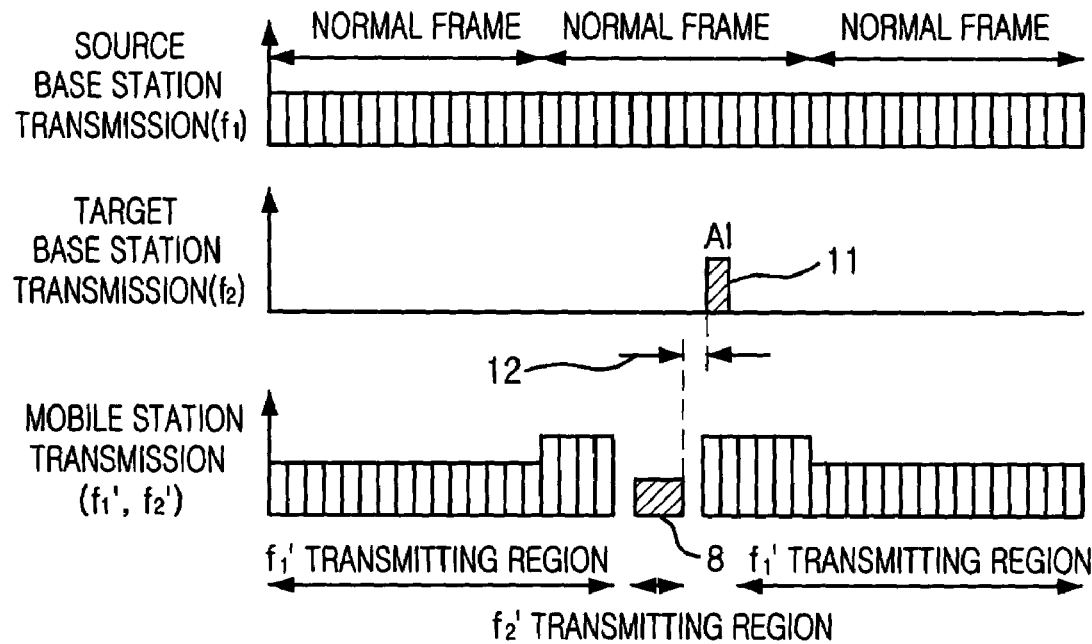
FIG. 5 is a diagram representing an example of uplink and downlink transmission in case of a mobile station having a dual-mode receiver for a seamless inter-frequency hard handover in accordance with an embodiment of the present invention.
Figure 6:
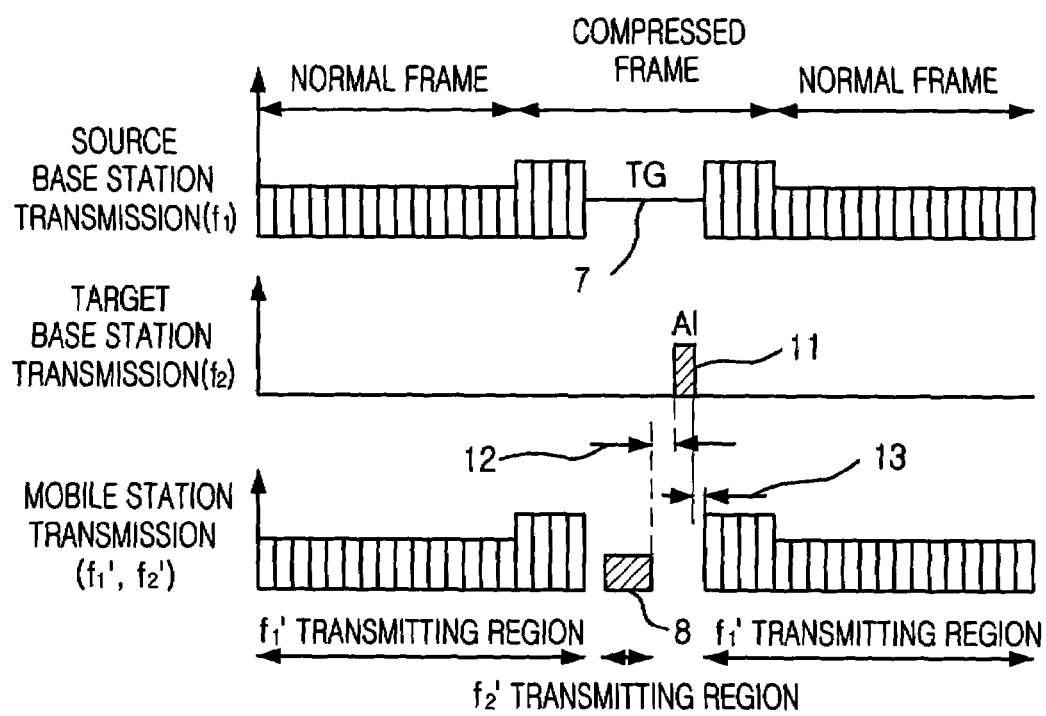
FIG. 6 is a diagram illustrating an example of uplink and downlink transmission in case of a mobile station having single-mode receiver for a seamless inter-frequency hard handover in accordance with an embodiment of the present invention.

FIGS. 5 and 6 show an example that the target base station 3 transmits an acknowledgment for the synchronization in the form of an acquisition indicator (AI) to the mobile station 1 by using the downlink of frequency $f_2$ after acquiring the synchronization of signals transmitted from the mobile station 1 by using the preamble 8 of the uplink transmitted through the frequency $f_2'$.

FIG. 5 shows an example of data transmitting between a mobile station and a base station in case of the mobile station having a dual-mode receiver and FIG. 6 shows an example of data transmitting between a mobile station and a base station in case of the mobile station having a single-mode receiver.

As illustrated in FIGS. 5 and 6, the AI transmitted by the target base station 3 is not related with a structure of the receiver of the mobile station, whereas a structure of frames transmitted from the source base station 2 and a role of the frames at receiver of the mobile station are depending on the structure of the receiver of the mobile station. That is, in case the mobile station 1 has the single-mode receiver, the source base station 2 transmits the compressed frame in the downlink as shown in FIG. 6 as a frame, which is corresponding to a location of the AI 11 transmitted from the target base station 3, on the other hand, case of the mobile station 1 has the dual-mode receiver, a normal frame is transmitted as shown in FIG. 5.

As shown in FIGS. 5 and 6, the target base station 3 transmits the AI after a certain period time is passed by considering the processing time after receiving the preamble 8 from the mobile station 1 and the mobile station 1 has to know a start point of transmitting the AI.

When demodulating the AI, the mobile station with the dual-mode receiver or the single-mode receiver can perform a non-coherent demodulation or can perform a coherent demodulation by using a common pilot channel transmitted through the downlink of the frequency $f_2$ from the target base station 3. Although it is not shown in the drawings, the target base station 3 transmits other channel of the downlink of the frequency $f_2$ such as a common pilot channel, a synchronization channel and data channel for other mobile station 1 and so on in a code division scheme.

In case the mobile station 1 has the single-mode receiver, the mobile station 1 uses the common pilot channel of the target base station 3, which is received through the frequency $f_2$ in the TG region 7, to coherently demodulate the AI.

In case the mobile station 1 has the single-mode receiver 1, the "Guard Time" 13 has to exist between the end of the AI transmission and the end of the TG region.

In the uplink preamble transmission method of the present invention shown in FIGS. 3 to 6, the mobile station 1 can transmit a same preamble several times by repeating the compressed mode several times so as to increase the probability of the target base station acquiring the synchronization. At this moment, the compressed mode pattern is transmitted from the base station controller 4 to the mobile station 1 and the target base station 3. Also, in the AI transmission of the downlink described in FIGS. 5 and 6, the target base station 3 can transmit the AI several times to increase the probability of the mobile station 1 detecting the AI. Parameters related to the compressed mode pattern are defined in the 3GPP TS25. 525 standard.

Figure 7:
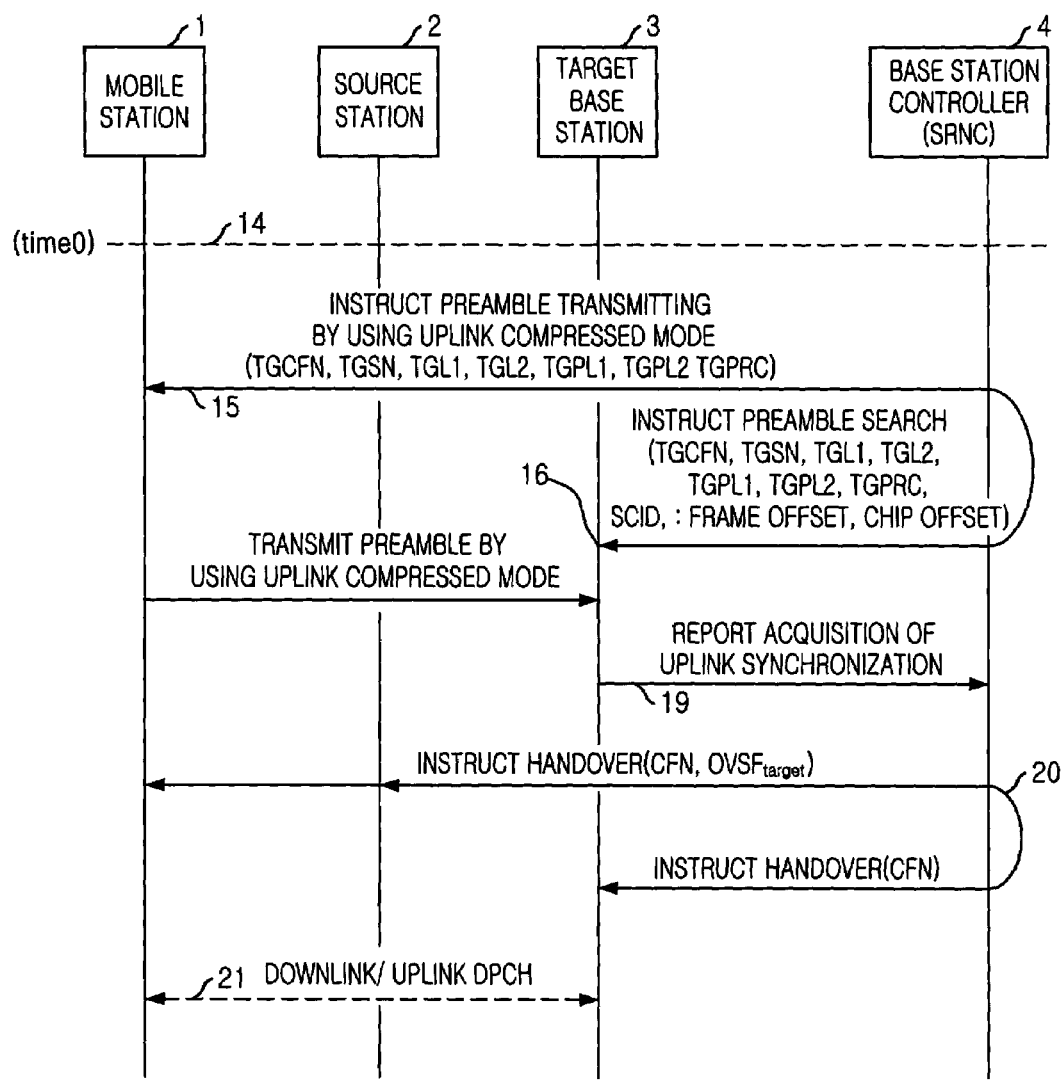
FIG. 7 shows a signal flow between systems in case a target base station does not transmit an AI through a downlink when a network knows a frame offset for a seamless inter-frequency hard handover in accordance with the present invention.

FIG. 7 is a diagram illustrating a signaling procedure between the mobile station 1, the source base station 2, the target base station 3 and the base station controller 4 during performing the hard handover in case that the frame offset is known to the base station controller 4 and the target base station 3 does not transmit the acquisition indication (AI) for the acquisition of the downlink preamble to the mobile station 1, wherein the frame offset is a difference between the SFN of the target base station 3 and the CFN of the mobile station 1.

In FIG. 7, it is assumed that the frame offset is known to the base station controller 4 but the target base station 3 does not transmit the AI to the downlink. Referring to FIG. 7, at time0 14, the mobile station 1 and the source base station 2 are communicating through the frequency $f_1$ ($f_1'$); the target base station 3 has resources to support the mobile station 1 through the frequency $f_2$ ($f_2'$); the frame offset and a chip offset were known to the base station controller 4 which $OVSF_{target}$ from the target base station 3, the mobile station acquired the synchronization of the downlink of the target base station 3; and the target base station 3 does not acquire the synchronization of the uplink.

That is, at the time0 14, the mobile station 1 and source base station 2 are communicating through $f_1$ (downlink) and $f_1'$ (uplink); the target base station 3 has reported to the base station controller 4 that there are resources at the $f_2$ ($f_2'$) link to support the mobile station 1 and also the target base station 3 has reported an orthogonal variable spreading factor (OVSF) code of the downlink to be used by the mobile station 1 at the downlink to the base station controller 4 after performing the handover.

As mentioned above, the base station controller 4 already knows the frame offset and the chip offset at the time0 14. Herein, the frame offset represents the difference between the SFN of the target base station 3 and the CFN of the mobile station 1 and it is defined in the standard TS25. 402 (Release'99) of 3GPP. Also, the SFN is a frame number of a common control channel of the downlink and has a range of 0 to 4095 and the CFN is a transport channel frame number, having a range of 0 to 255 and is determined after a communication link between the mobile station 1 and a base stations is established.

The base station controller 4 can know the frame offset by receiving the frame offset from the mobile station before the time0 14 in case the mobile station 1 has a dual-mode receiver or analogizing the frame offset from information reported from other base stations. The chip offset is a difference between frame boundary of a transport channel of the mobile station 1 and a frame boundary of a common control channel of the target base station 3 and has a range of 0 to 38399 chips. The mobile station 1 measures the chip offset by using the dual-mode receiver or using the compressed mode in case of a single mode receiver and the measured chip offset transmitted to the base station controller 4. The chip offset is defined in TS25. 402 (Release'99).

Also, at the time0 14, the mobile station 1 has acquired the synchronization of the downlink of the target base station 3 while the target base station 3 has not acquired the synchronization of the uplink.

The base station controller 4, which knows the frame offset, transmits in step 15 the transport channel frame number (TGCFN) of starting the compressed mode in the uplink of the mobile station 1 after the time0 14, information for a starting slot number of the TG (TGSN), information for the compressed mode pattern (TGL1, TGL2, TGD, TUPL1, TGPL2) and information for a total length of the compressed-mode TGPRC to the mobile station 1 before TGCFN.

Figure 8:
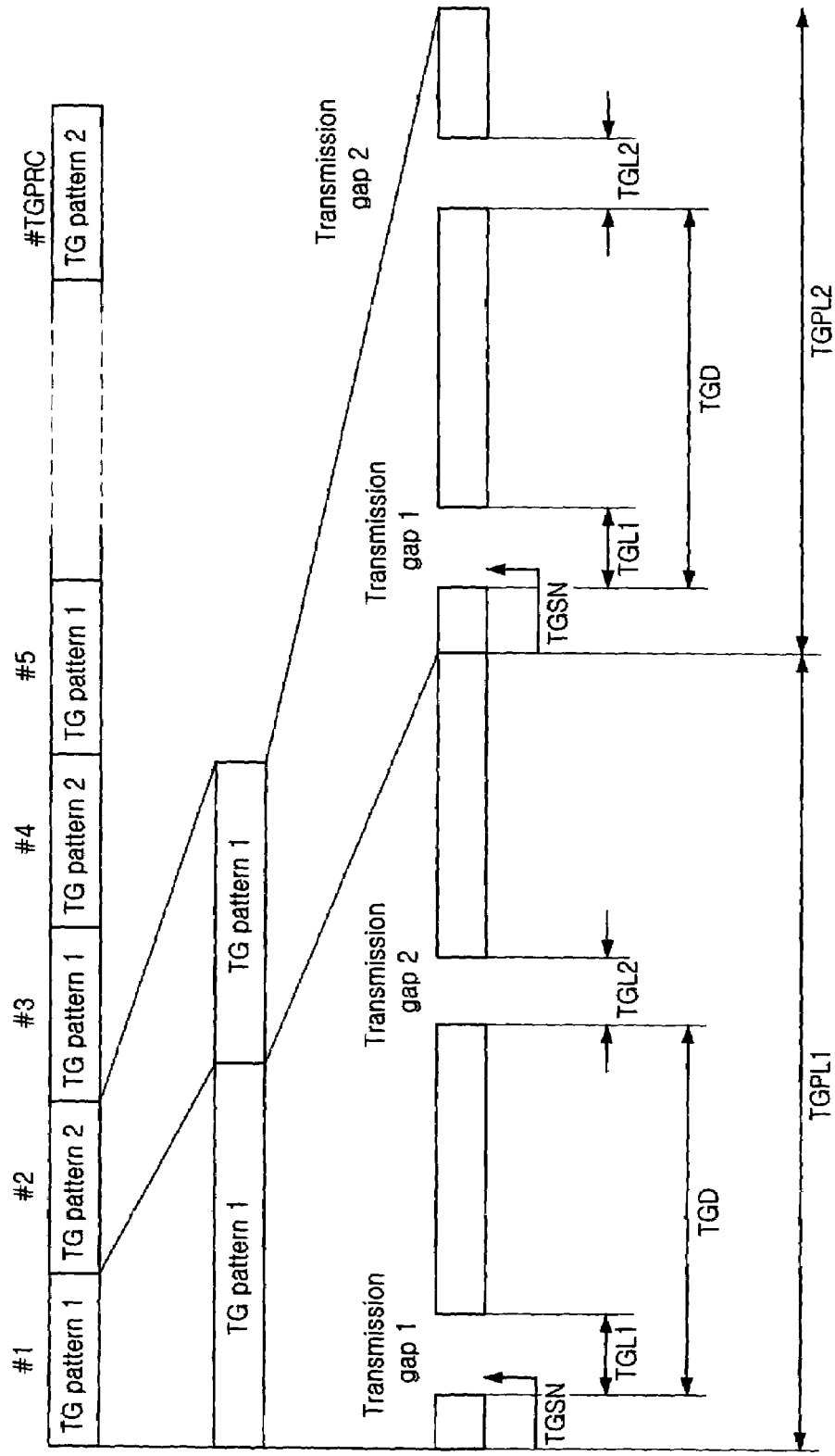
FIG. 8 is a diagram illustrating a compressed mode pattern of the 3GPP W-CDMA employed in the present invention.

FIG. 8 shows parameters for the compressed mode pattern defined in the 3GPP TS25.215. The mobile station 1 transmits the uplink preamble at a time decided by the compressed mode pattern received from the base station controller 4. The mobile station 1 uses an open loop power control when transmitting the fist preamble. That is, the mobile station 1 determines a transmission power of the first preamble by using the intensity of received signals measured at the downlink $f_2$ of the target base station 3 before the time0 14 or a signal to noise rate (Ec/Io) of received signals at the common pilot channel.

Also, the controller of base station 4, which knows the frame offset, transmits a transport channel frame number (TGCFN) of starting uplink compressed mode of the mobile station 1 after the time0 14, information for a starting slot number of each TG (TGSN), information of the compressed mode pattern (TGL1, TGL2, TGD, TGPL1, TGPL2), information of total length of the compressed mode (TGPRC), a frame offset, information for a chip offset and a scrambling code number (SCID) to the target base station 3 before the TGCFN 16 in step 16.

After then, the target base station 3 acquires the synchronization of the preamble transmitted from the mobile station 1 by using the frame offset, the chip offset information, the SCID and the compressed mode pattern received from the base station controller 4.

Figure 9:
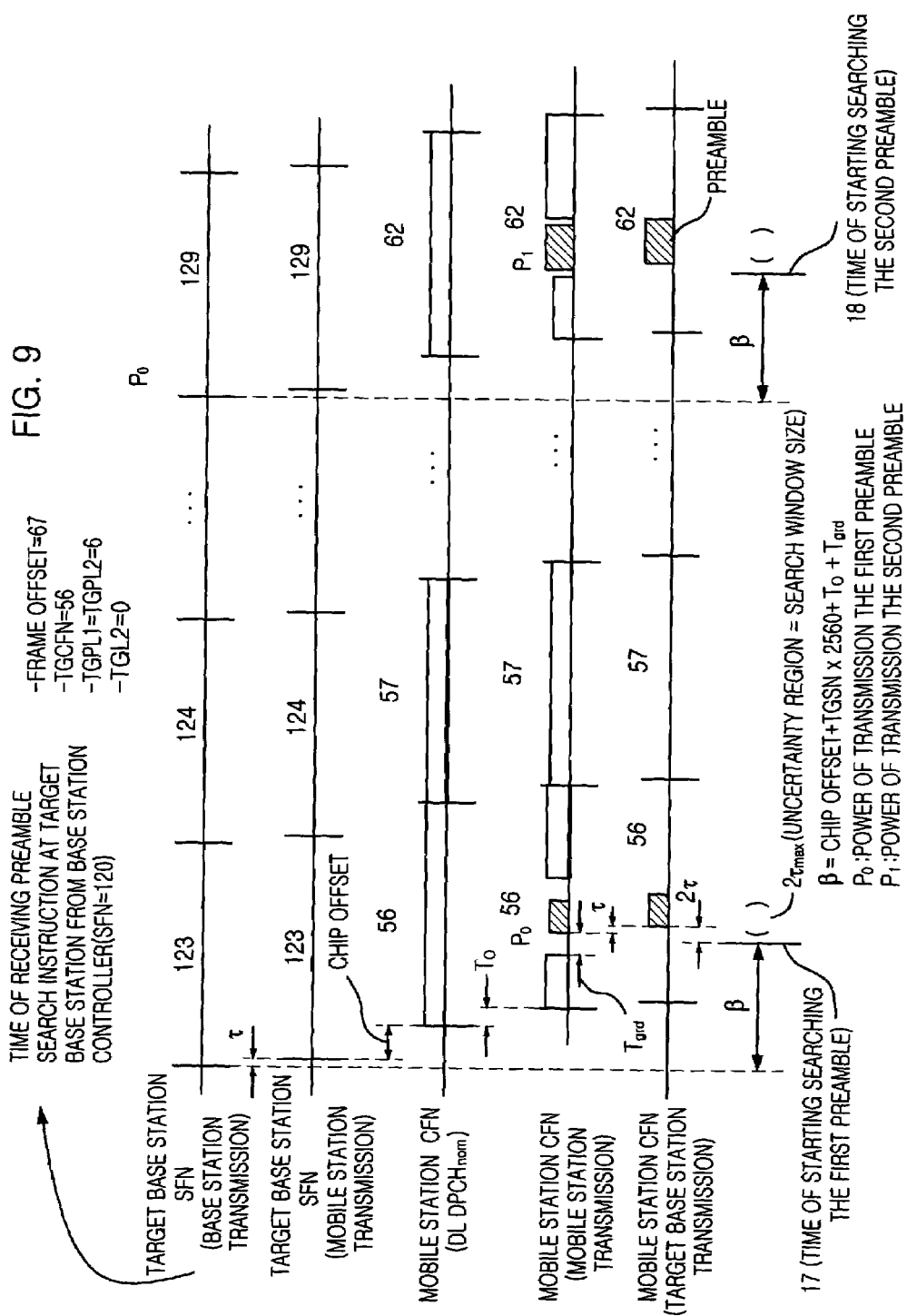
FIG. 9 exemplifies a timing chart showing that a target base station decides a searching region for a preamble transmitted from a mobile station having a dual-mode receiver in case a frame offset is known to a network for a seamless inter-frequency hard handover in accordance with the present invention.

FIG. 9 provides a timing chart illustrating that the target base station 3 decides a searching region for the preamble transmitted from the mobile station 1 by using the information from the base station controller 4.

Referring to FIG. 9, it is assumed that the mobile station 1 has the dual-mode receiver.

At first, the target base station 3 calculates the SFN corresponding to the TGCFN by using the frame offset and a following equation EQ. 1.

$$SFN \bmod 256 = (\text{frame offset} + TGCFN) \bmod 256 \qquad \text{EQ. 1}$$

Since in the equation EQ. 1, the range of the SFN is 4096 and that of the TGCFN is 256, there are 16 SFNs satisfying the equation EQ. 1. For example, if the frame offset is 67 as shown in FIG. 9, the SFNs become 123, 379, 635, . . .

A base station searcher selects an SFN whose value is closest to a frame corresponding to a time of receiving a preamble searching order from the base station controller 4 among the 16 possible SFNs as the SFN corresponding to the TGCFN. Therefore, in FIG. 9, "123" is selected as the SFN corresponding to the TGCFN since the "123" is closest to a time "120", which is a time of receiving the preamble searching order from the base station controller 4. The target base station 3 searches the uplink preamble by setting up a searching region from a time 17, which is β chips away from boundary of a corresponding frame (e.g., 123 frame in FIG. 9), to a time which is "preamble length+$2\tau_{max}$". Herein, β is defined as follows:

$$\beta = \text{chip offset} + TGSN \times 2560 + T_o + T_{grd} \qquad \text{EQ. 2}$$

In the equation EQ. 2, $T_o$ is a difference between a downlink time (DL $DPCH_{nom}$) and an uplink time of the mobile station 1 and it is defined as 1024 chips in the 3GPP standard. As before mentioned $T_{grd}$ is a Guard Time before the mobile station 1 transmits the preamble and the $T_{grd}$ should be known to the target base station 3. β may be larger or smaller than 38400 chips.

In FIG. 9, $2\tau_{max}$ is the maximum round trip delay corresponding to a cell coverage of the target base station 3 and equal to a search window size of the target base station 3. If it is assumed that the chip transmission speed is 3.84 Mcps and the cell coverage is 20 km, $2\tau T_{max}$ becomes almost 512 chips.

In case the preamble searching is failed, the target base station 3 searches the uplink preamble by setting up the search region from a time 18, which is β chips away from a boundary of a next frame (e.g., 129 frame in FIG. 9) designated by a compressed mode pattern received from the controller of base station 4, to a time, which is "preamble length+$2\tau_{max}$". The target base station 3 repeatedly performs the above-mentioned procedure until the preamble is detected.

The target base station 3 acquires the uplink synchronization by using the configuration of FIG. 9 and reports it to the base station controller 4 in step 19. At this moment, the target base station 3 also transmits the receiving intensity of the preamble (e.g., $E_c/I_o$ value) transmitted from the mobile station 1. Then, in step 20, the base station controller 4 instructs the source base station 2, the mobile station 1 and the target base station 3 to perform the handover. At this time, the base station controller 4 transmits a CFN at a time at which the handover starts to the source base station 2, the mobile station 1 and the target base station 3 and further transmits $OVSF_{target}$ to be used as a channel spread code of a new downlink in the handover to the mobile station 1.

The mobile station 1, which received the handover instruction from the base station controller 4, stops transmitting the preamble using the compressed mode. Also, the mobile station 1 disconnects the call with the source base station 2 at the CFN received from the base station controller 4 and starts to communicate with the target base station 3 by using a new frequency $f_2$ ($f_2'$) in step 21. Before starting to the communicate between the target base station 3 and the mobile station 1 at the corresponding CFN, the uplink and the downlink have been already synchronized by the method of the present invention and, therefore, a call disconnection there between does not occur.

Figure 10:
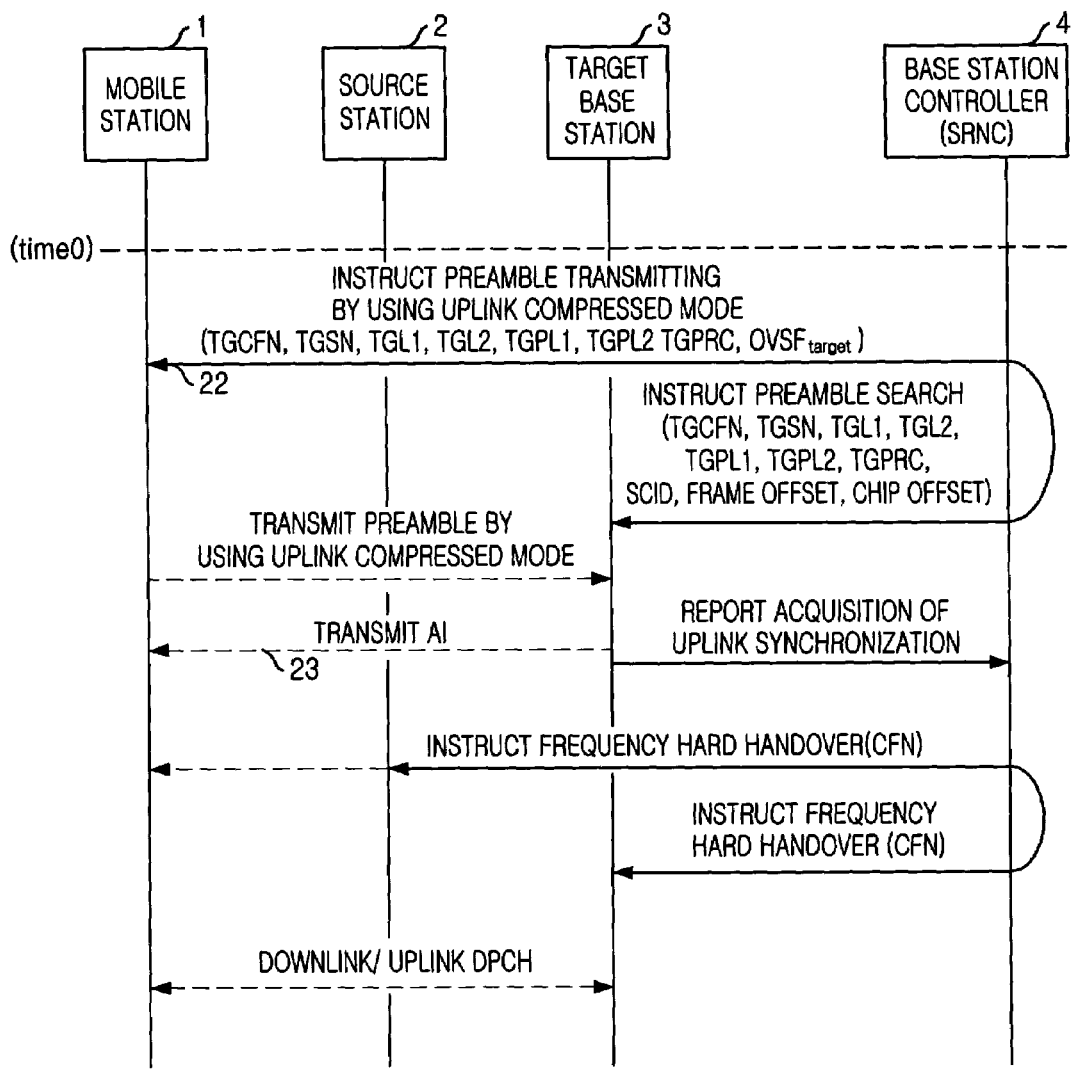
FIG. 10 presents a signal flow between systems in case a target base station transmits AI through a downlink when a frame offset is known to a network for a seamless inter-frequency handover in accordance with the present invention.

FIG. 10 is a diagram illustrating a signaling procedure between the mobile station 1, the source base station 2, the target base station 3 and a base station controller 4 during performing the hard handover in case that the frame offset is known to the base station controller 4 and the target base station 3 transmits the AI for the synchronization acquisition for the uplink to the mobile station 1.

In FIG. 10, it is assumed that the base station controller 4 knows the frame offset and the target base station 3 transmits the AI through the downlink. In FIG. 10, at a time0 14, the mobile station 1 and the source base station 2 are communicating with each other through $f_1$ ($f_1'$), the target base station 3 has resources at the $f_2$ ($f_2'$) link to support the current mobile station 1; the base station controller 4 knows the frame offset and chip offset and has received $OVSF_{target}$ from the target base station 3; the mobile station 1 has acquired already the synchronization of the downlink of the target base station 3; and the target base station 3 does not acquire the synchronization of the uplink yet.

The signaling procedure of FIG. 10 is similar to that of FIG. 7 but the base station controller 4 transmits not only parameters related to a compressed mode pattern but also $OVSF_{target}$ code information to be used for the downlink in the handover, when the base station controller 4 instructs the mobile station 1 to transmit an uplink preamble in step 22. Also, after acquiring the uplink synchronization, in step 23, the target base station 3 transmits the AI for the synchronization through the downlink by using a configuration shown in FIG. 11.

When transmitting the AI, the target base station 3 uses an $OVSF_{target}$ code as a channel spread code, wherein the $OVSF_{target}$ code is identical to the $OVSF_{target}$ code sent when instructing the mobile station 1 to transmit the uplink preamble in the step 22, and the mobile station 1 uses the $OVSF_{target}$ when demodulating the AI.

In a method shown in FIG. 10, in which the target base station 3 transmits the AI in case the base station controller 4 knows the frame offset, the procedure of searching the uplink preamble performed by the target base station 3 is identical to a method shown in FIG. 7 in which the target base station 3 down not transmit the AI.

Figure 11:
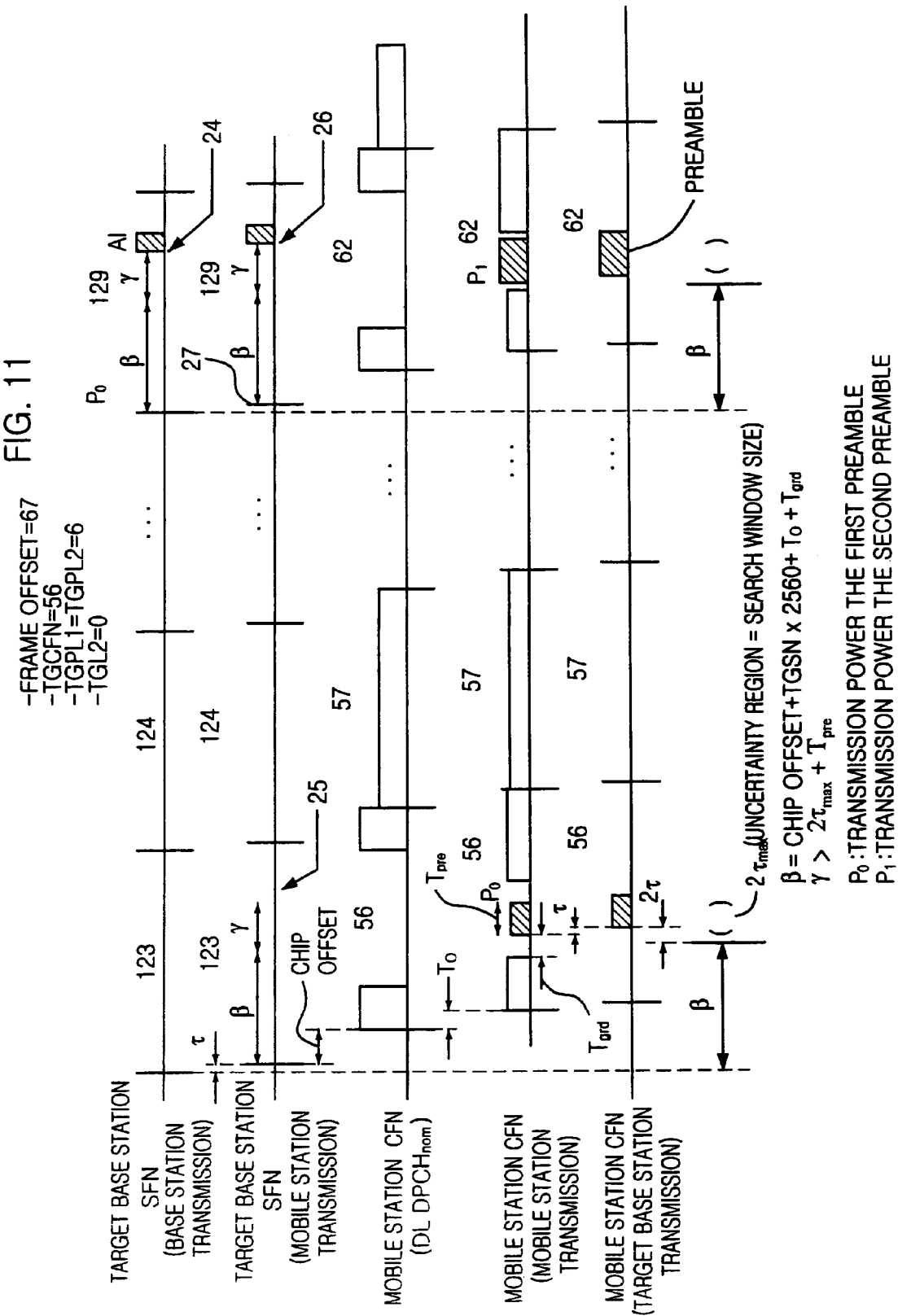
FIG. 11 is a timing chart in case a target base station transmits an AI for detecting a preamble when a frame offset is known to a network for a seamless inter-frequency handover in accordance with the present invention.

FIG. 11 shows an example that the target base station 3 succeeds in detecting a preamble at a second time after failing to detect preamble at a first time, wherein the preamble is transmitted from the mobile station, having a single-mode receiver.

The target base station 3 transmits the AI after succeeding in detecting the uplink preamble, and the AI is transmitted at a second point 24, which is γ chips away from a first point, β chips away from a boundary of a frame designated by the compressed mode pattern, wherein the designated frame is a 129 frame in FIG. 11. In here, β is defined in the equation EQ. 2 and γ should satisfy a following equation EQ. 3. The γ has to be known to the target base station 3 and the mobile station 1 and, therefore, this should be newly defined in the 3GPP standard.

$$\gamma > 2\tau_{max} + T_{pre} \quad \text{EQ. 3}$$

The mobile station 1 demodulates the AI at times, at which the mobile station is expected to receive the AI, such as 25 and 26 in FIG. 11, wherein the mobile station 1 has known β and γ and acquired a frame boundary 27 of signals received from the target base station 3. In case the mobile station has the single-mode receiver, as like in FIG. 11, the compressed mode of downlink is used. The mobile station 1, which received the AI does not transmit the preamble any more. If it fails to detect the AI, the mobile station 1 re-transmits the preamble in a next compressed mode region. After transmitting the preamble, if the preamble is detected again in a next compressed mode, the target base station 3 re-transmits the AI.

The target base station 3 detecting the preamble reports the detection of the preamble to the base station controller 4 and then the base station controller 4 instructs the source base station 2, the mobile station 1 and the target base station 3 to perform the handover. At this moment, the base station controller 4 transmits the CFN at a point of the handover started to the source base station 2, the mobile station 1 and the target base station 3. The mobile station 1, which received the handover instruction from the base station controller 4, disconnects communication with the source base station 2 at the CEN and starts to communicate with the target base station 3 by using the new frequency $f_2$ ($f_2'$). Before starting to communicate with the target base station 3 and the mobile station 1 at corresponding CFN, synchronization with the uplink and downlink is acquired by using the method of the present invention and, therefore, the call disconnection there between does not occur.

In the W-CDMA FDD standard (Release'99) of the 3GPP, if the base station controller 4 does not know the frame offset, which is a difference between the SFN of the target base station 3 and the CFN of the mobile station 1, when performing the handover, the mobile station 1 disconnects the established frequency completely and re-acquires the SFN of the target base station 3 through a new frequency for performing the hard handover. Therefore, at least 50 msec of additional call disconnection may occur between the mobile station 1 and the target base station 3.

For the case that the base station controller 4 does not know the frame offset, the handover method of the present invention forces the base station controller to know the frame offset before performing the handover by using the AI transmitted from the target base station 3 to the mobile station 1. This will be explained in detail with reference to FIG. 12.

Figure 12:
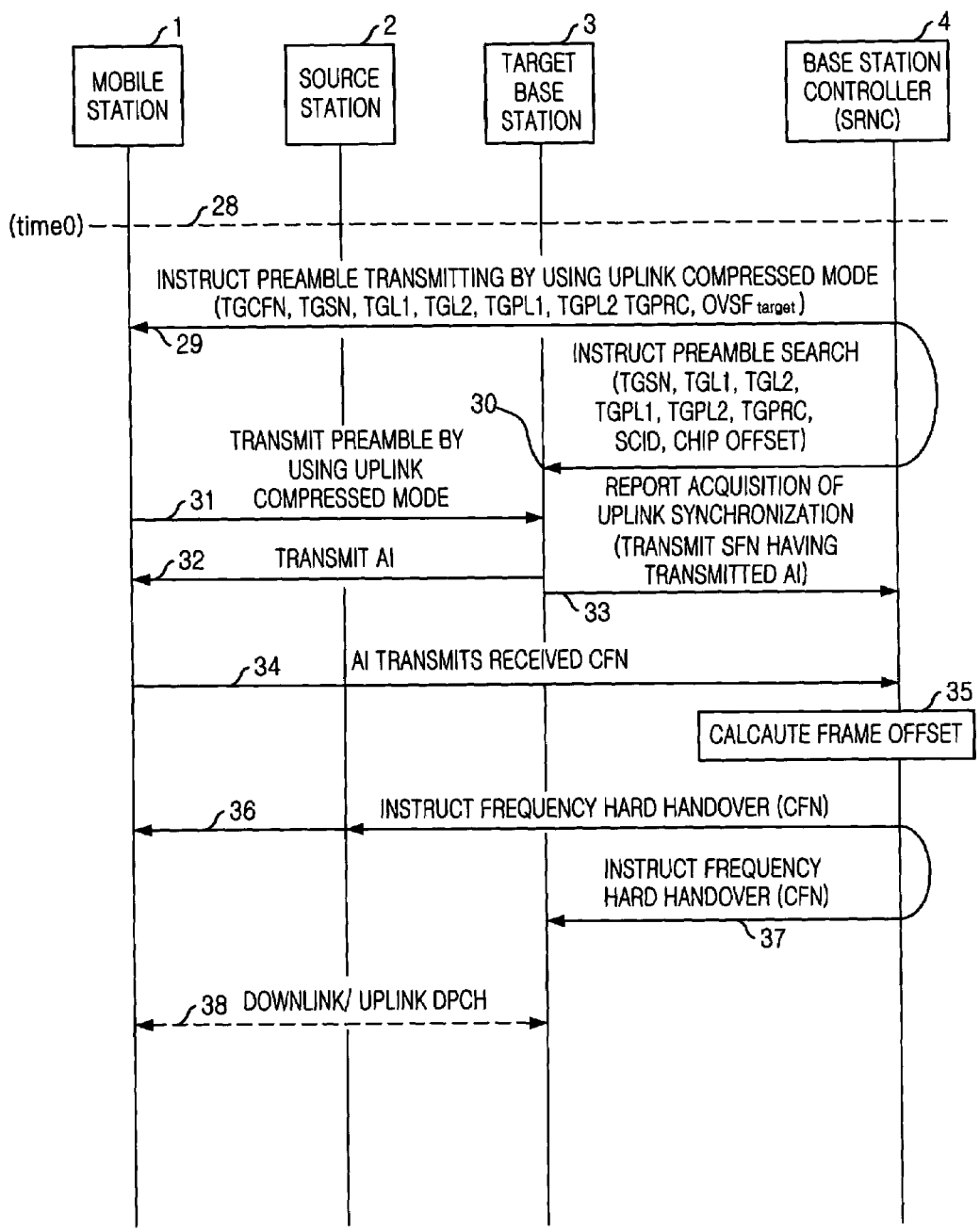
FIG. 12 illustrates a signal flow chart in case one class of AI and one class of preamble is transmitted when a frame offset is not known to a network for a seamless inter-frequency handover in accordance with the present invention.

FIG. 12 shows a signaling procedure between the mobile station 1, the source base station 2, the target base station 3 and the base station controller 4 during performing the hard handover in case that the base station controller 4 does not know the frame offset.

In FIG. 12, it is assumed that the base station controller 4 does not know the frame offset. At time0 28 in FIG. 12, the mobile station 1 and the source base station 2 are communicating with each other through the frequency f1 (f1'); the target base station 3 has resources at the f2 (f2') link to support the mobile station 1; the base station controller 4 knows the chip offset but does not know the frame offset, and has received $OVSF_{target}$ from the target base station 3; the mobile station 1 has already acquired the synchronization of the downlink of the target base station 3; and the target base station 3 does not acquire the synchronization of the uplink yet.

That is, at time0 28, the mobile station 1 and the source base station 2 are communicating with each other through the frequencies $f_1$ (downlink) and $f_1'$ (uplink); the target base station 3 has reported to the base station controller 4 that there are resources at the f2 (f2') link to support the mobile station 1; and an orthogonal variable spreading factor (OVSF) code of the downlink has been already reported to the base station controller 4, wherein the OVSF code will be used in the downlink by the mobile station 1 after the handover performed.

As mentioned above, the base station controller 4 knows the chip offset but does not know the frame offset at time0 28.

The signaling procedure shown in FIG. 12 is similar to that in FIG. 10. However, the base station controller 4 does not transmit the frame offset information to the target base station 3 when instructing the target base station 3 to search an uplink preamble in step 30. It is because the base station controller 4 does not know the frame offset information.

Figure 13:
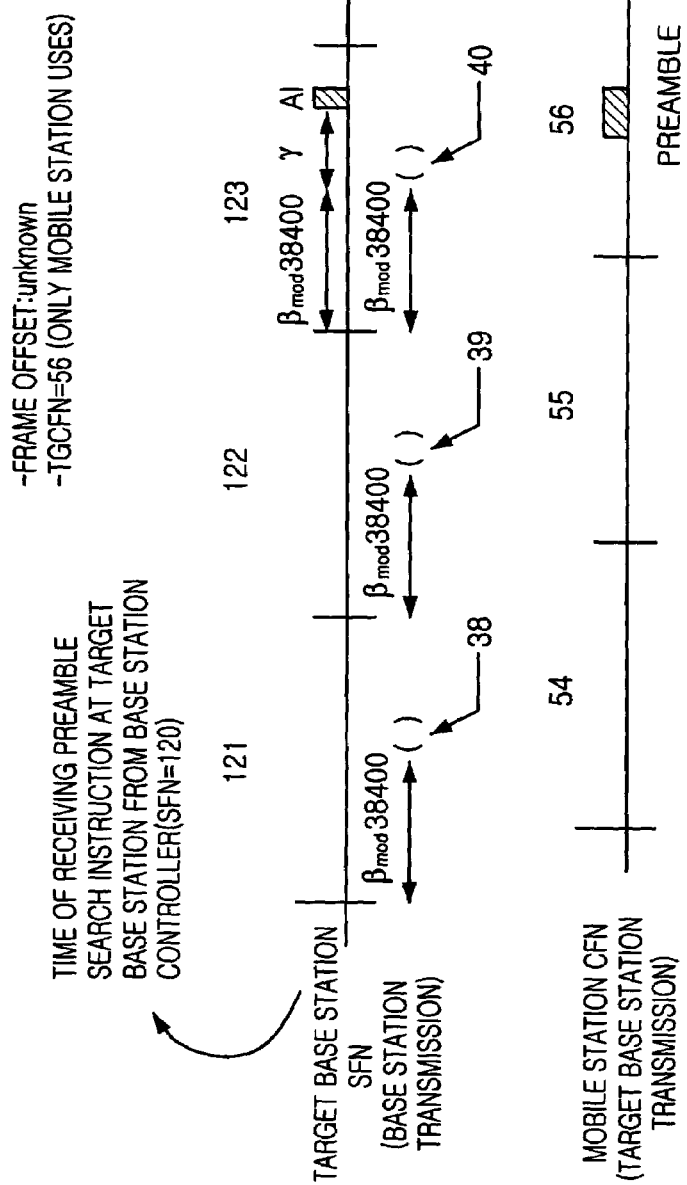
FIG. 13 is a timing chart illustrating that a target base station searches a preamble in a corresponding region of each frame from a moment it receives a preamble search order in case a frame offset is not known to a network for a seamless inter-frequency handover in accordance with the present invention.

The target base station 3, which received the preamble searching instruction in the step 30, performs the preamble searching process for a corresponding region of the frame from the moment of receiving the preamble searching order. This is illustrated in FIG. 13.

Since the target base station 3 does not know an SFN of a frame through which the mobile station 1 transmits the preamble in step 31 but knows information for a slot at which the preamble starts, the target base station 3 sets up searching regions (38, 39, 40, . . . ) from a boundary of each frame to a point, which is $2\tau_{max}$ away from an offset of $\beta_{mod}$ 38400 and searches the preamble. In here, "$_{mod}$ 38400" is used because, as mentioned, $\beta$ may be larger than 38400.

The target base station 3, which succeeded in searching the preamble, transmits the AI in step 32 to the mobile station 1 through the downlink, and, at the same time, reports the acquisition of the uplink synchronization to the base station controller 4 in step 33. At this time, the SEN corresponding to the AI is also transmitted. After then, the mobile station 1, which received the AI from the target base station 3, transmits a CFN of the frame corresponding to the received AI to the base station controller 4 in step 34. At this time, the base station controller 4 calculates the frame offset in step 35 by using the SFN received from the target base station 3 and the CEN information received from the mobile station 1 for the AI transceiving time.

The target base station 3, which succeeded in searching the preamble, transmits the AI to the mobile station 1 through the downlink, and, at the same time, reports the acquisition of the uplink synchronization to the base station controller 4 in step 33. At this time, the SFN corresponding to the AI is also transmitted. After then, the mobile station 1, which received the AI from the target base station 3, transmits a CFN of the frame corresponding to the received AI to the base station controller 4 in step 34. At this time, the base station controller 4 calculates the frame offset in step 35 by using the SFN received from the target base station 3 and the CFN information received from the mobile station 1 for the AI transceiving time.

Figure 14:
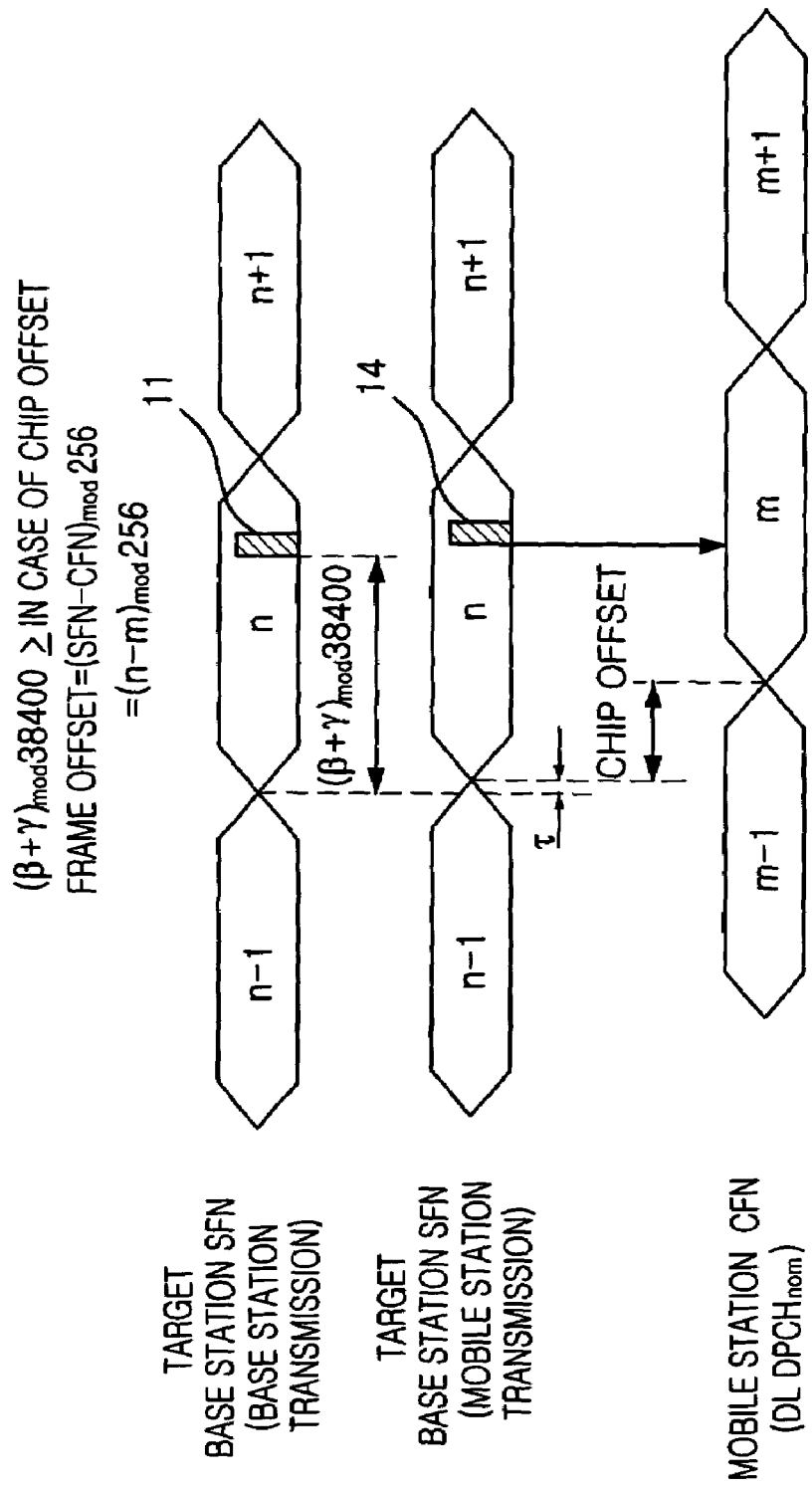
FIG. 14 is a view illustrating that a base station controller calculates a frame offset by using an SFN from a target base station and a CFN from a mobile station in case the frame offset is not known to a network for a seamless inter-frequency handover in accordance with an embodiment of the present invention.
Figure 15:
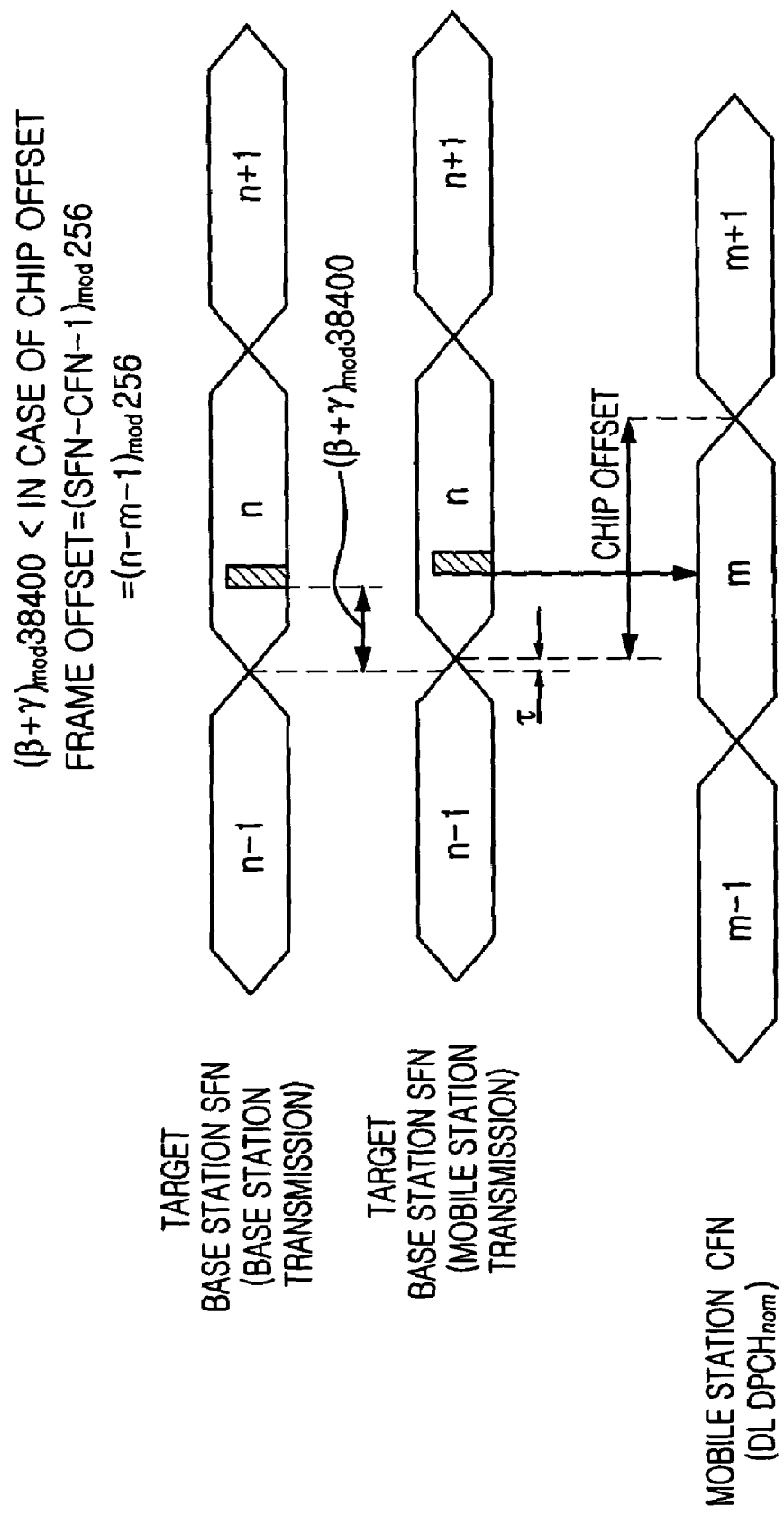
FIG. 15 is a view describing that a base station controller calculates a frame offset by using an SFN of a target base station and a CFN of a mobile station in case the frame offset is not known to a network for a seamless inter-frequency handover in accordance with another embodiment of the present invention.

FIGS. 14 and 15 show a procedure of calculating the frame offset performed in the base station controller 4 by using the SFN information received from the target base station 3 and the CFN information received from the mobile station 1.

After calculating $(\beta+\tau)_{mod}38400$, if the calculated value is smaller than the chip offset, the base station controller 4 determines the value of the frame offset as $(SFN-CFN-1)_{mod} 256$ and, if otherwise, decides the value of the frame offset as $(SFN-CFN)_{mod}256$. This is shown in an equation EQ. 4.

$$\text{frame offset} = (SFN\text{-}CFN\text{-}1)_{mod}256 \text{ for } (\beta+\tau)_{mod}38400 < \text{chip offset}$$

$$\text{frame offset} = (SFN\text{-}CFN)_{mod}256 \text{ for } (\beta+\tau)_{mod}38400 \; 24 \text{ chip offset}$$

EQ. 4

When transmitting the AI, the target base station 3 uses the $OVSF_{target}$ code, which is identical to the $OVSF_{target}$ used when sending the uplink preamble transmitting instruction in the step 22 to the mobile station 1, as a channel spread code and the mobile station 1 uses the same $OVSF_{target}$ when demodulating the AI.

After calculating the frame offset, the base station controller 4 instructs the source base station 2, the mobile station 1 and the target base station 3 to perform the handover in steps 36 and 37. At this time, the base station controller 4 provides the mobile station 1 with the CFN in which the handover is performed and, in turn, the mobile station 1 disconnects the current communication link with the source base station 2 at the CFN and starts to communicate with the target base station 3 through a new frequency $f_2$ ($f_2$').

The base station controller 4 transmits the calculated frame offset and the CFN at which the handover is performed to the target base station 3 in step 37. At this time, the target base station 3 calculates an SFN corresponding to the CFN at which the handover is performed by using the frame offset received from the base station controller 4 and receives an uplink DPCH at the same time transmitting, a downlink DPCH from the moment corresponding to the calculated SFN in step 38.

As mentioned above, although the base station controller 4 does not know the frame offset, the handover method of the present invention forces the base station controller 4 to know the frame offset before performing the handover by using the AI transmitted from the target base station 3 to the mobile station 1 and transmits the frame offset the target base station 3 together with the handover instruction, so that, it is possible to perform the seamless inter-frequency hard handover.

Figure 16:
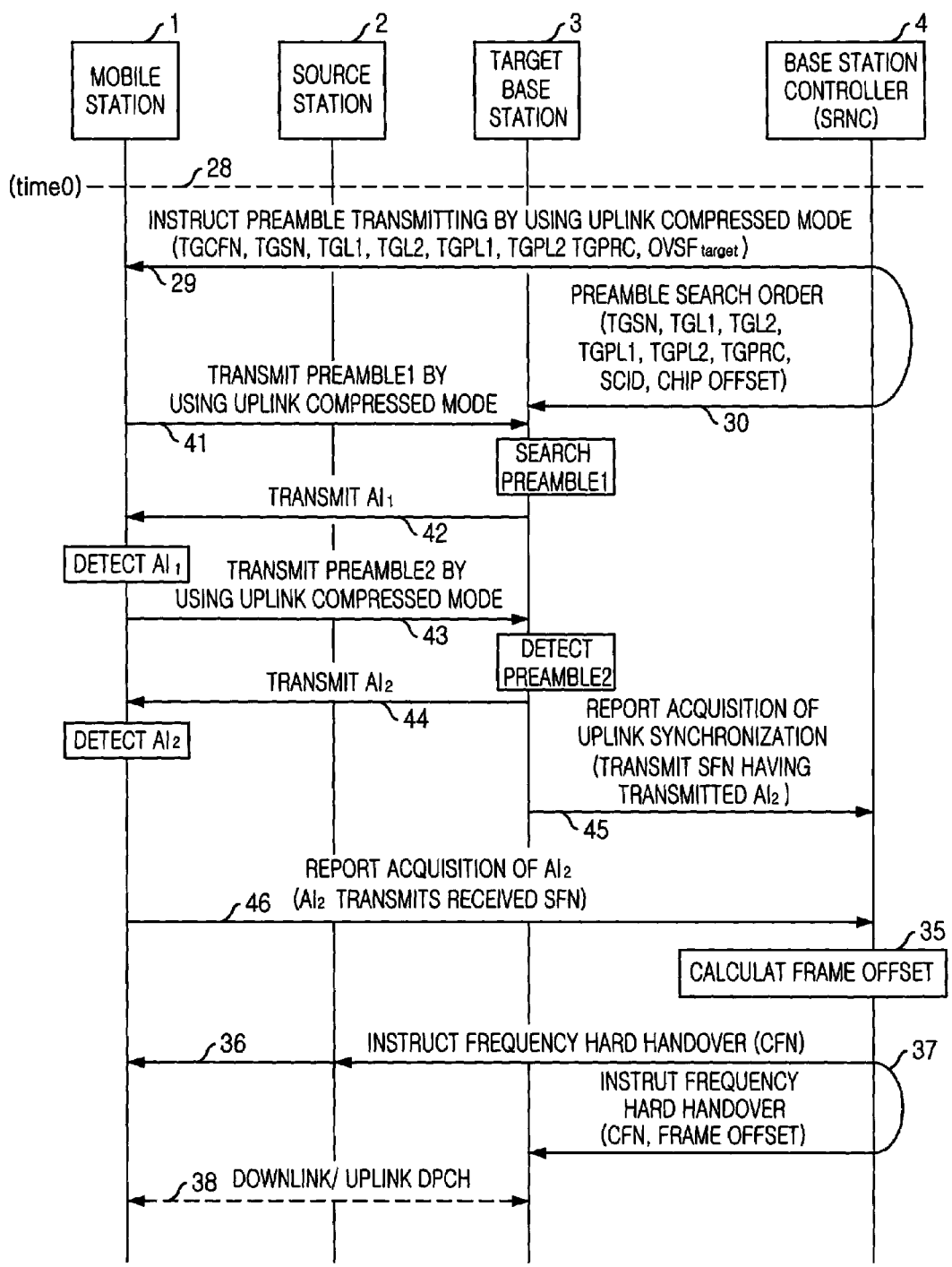
FIG. 16 is a signal flow chart in case two classes of AI and two classes of preamble are transmitted when a frame offset is not known to a network for a seamless inter-frequency handover in accordance with the present invention.

FIG. 16 shows a signaling procedure of a method using two classes of preambles and two classes of AIs in each of the mobile station 1 and the base station to minimize false handover instruction given by the base station controller 4 by minimizing the false detection probability of the mobile station 1 and the target base station 3 in case the base station controller does not know the frame offset.

The mobile station 1, which received a preamble transmitting instruction from the base station controller 4 transmits the preamble$_1$ through the frequency $f_2$' by using the uplink compressed mode in step 41. At this time, the target base station 3, which received the preamble searching instruction from the base station controller 4 searches the preamble$_1$ according to the above-mentioned procedure described in FIG. 13. After succeeding in searching the preamble$_1$, the target base station 3 transmits an $AI_1$, which is an acknowledgement for succeeding in searching the preamble$_1$, the frequency $f_2$ in step 42. And then, the mobile station 1 detects the $AI_1$, which is transmitted to the frequency $f_2$, by using the downlink compressed mode or the dual-mode receiver and, in turn, transmits a preamble$_2$ to a frequency $f_2$' at a next compressed frame in step 43.

After transmitting the preamble$_2$, the target base station 3 detects the preamble$_2$, transmits an $AI_2$ in step 44, which is an acknowledgement for achieving to detect the preamble$_2$, to the mobile station 1, and reports the acquisition of the uplink synchronization to the base station controller 4 at the same time of notifying an SFN through which the $AI_2$ is transmitted to the base station controller 4 in step 45.

The mobile station 1 detects the $AI_2$ received through the frequency $f_2$ by using the downlink compressed mode or the dual-mode receiver and reports the detection of $AI_2$ to the base station controller 4 at the same time of notifying, CFN through which the $AI_2$ is also received to the base station controller 4 in step 46. And then, the base station controller 4 calculates the frame offset by using the equation EQ. 4 with the SFN transmitted from the target base station 3 and the CFN transmitted from the mobile station 1 and invokes the source base station 2, the target base station 3 and the mobile station 1 to perform the handover in the steps 36 and 37. At this moment, the calculated frame offset is transmitted to the target base station 3. Steps after transmitting the calculated frame offset are same as the steps in FIG. 12.

Figure 17:
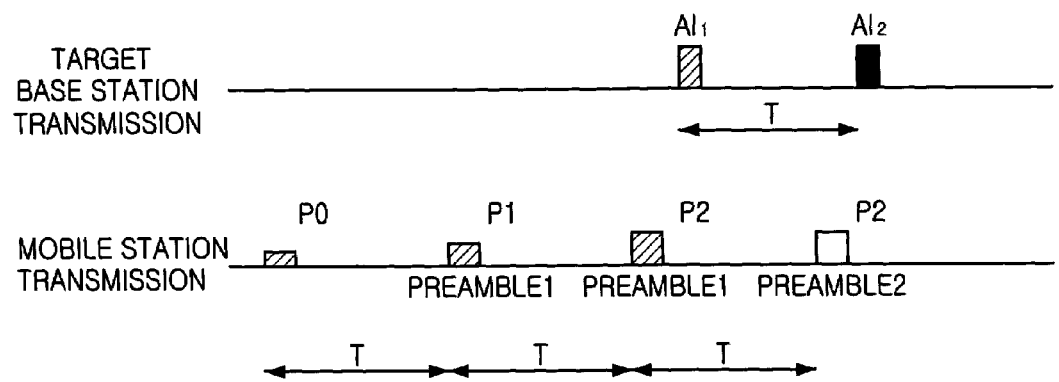
FIG. 17 shows an example of operations of a mobile station and a target base station in case two classes of AI and two classes of preamble are transmitted when a frame offset is not known to a network for a seamless inter-frequency handover in accordance with the present invention.

FIG. 17 shows an example of an AI transmission of a base station and a preamble transmission of the mobile station 1 when the method in FIG. 16 is used.

The mobile station 1 uses an open loop power P0 to transmit a $preamble_1$ at the first time and in case of failing to receive the $AI_1$, increases the power up to P1 to re-transmit the $preamble_1$. In case of failing to receive the $AI_1$, the above mentioned steps are performed repeatedly and in case of achieving to receive the $AI_1$, a $preamble_2$ is transmitted by using a power (P2) identical to the power by which the $preamble_1$, is thereby transmitted.

When using the method described in FIG. 16, in case that the base station controller 4 does not know the frame offset, a transmission cycle of the preamble of the mobile station 1 has to be constant. "T" in FIG. 17 represents the transmission cycle of the preamble. That is, the base station controller 4, which does not know the frame offset, should transmit a compressed mode pattern satisfying by the above requirement to the mobile station 1 and the target base station 3.

Figure 18:
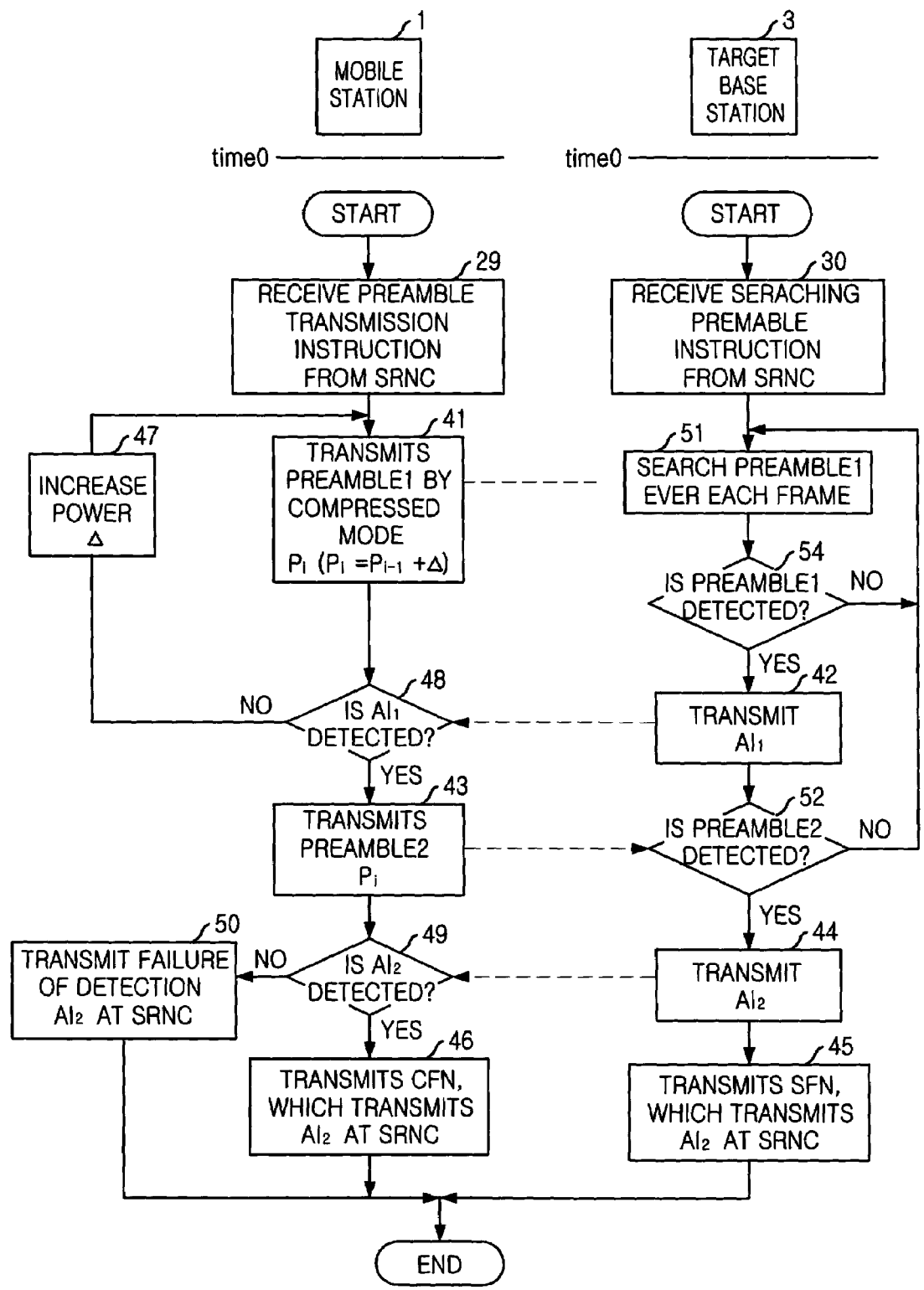
FIG. 18 provides a flowchart illustrating operations of a mobile station and a base station using the method of FIG. 16 for a seamless inter-frequency handover in accordance with the present invention.

FIG. 18 is a flowchart explaining operations of the mobile station and the base station, which use the method of FIG. 16.

At first, the mobile station 1, which received a preamble transmission instruction from the base station controller 4 in step 29, transmits the $preamble_1$ by using the uplink compressed mode in step 41 and then, detects the $AI_1$ in step 48. In the step 48, if the $AI_1$ is not detected, the mobile station 1 re-transmits the $preamble_1$ in the step 41, after increasing the power as much as Δ in step 47. On the other hand, if the $AI_1$ is detected, at a next compressed mode, the mobile station 1 transmits the $preamble_2$ by using a power identical to the power by which the $preamble_1$ is finally transmitted in step 43.

After transmitting the $preamble_2$, if the detection of the $AI_2$ is achieved in step 49, the mobile station 1 transmits a CFN at which the $AI_2$ is received to the base station controller 4 in step of 46 and, if the detection of the $AI_2$ is failed in the step of 49, the mobile station 1 notices the failure of detecting the $AI_2$ to the base station controller 4 in step 50.

Meanwhile, the target base station 3, which received a preamble search instruction from the base station controller 4 in step 30, searches the $preamble_1$ in every search region in step 51 by using the procedure of FIG. 13. The target base station 3 transmits the $AI_1$ in step 42 for the search region, at which the $preamble_1$ is detected in step 54, to the mobile station 1. Therefore, the $AI_1$ may be transmitted more than one time during the T in FIG. 17. In step 52, the target base station 3 detects the $preamble_2$ from a next expected point corresponding to the search region at which the $AI_1$ is transmitted in step 52. At the step 52, if the $preamble_2$ is detected, the $AI_2$ is transmitted in step 44 to the mobile station 1 and the searching process is terminated. And a SFN, at which the $AI_1$ is transmitted, is transmitted to the base station controller. If the $preamble_1$ or the $preamble_2$ are not detected, the above-mentioned procedures are performed repeatedly.

The base station controller calculates a frame offset value when it receives both of the CFN and SFN from the mobile station 1 and the base station and produces a handover instruction. In case that the base station controller receives a message of the failure to detect the $AI_2$ from the mobile station 1, does not receive the SFN for a certain duration after receiving the CFN, does not receive the CFN a predetermined duration after receiving the SFN, or receives no information for a time of TGPRC from the target base station 3 and the mobile station 1, the above-mentioned all steps are preformed again.

The above-mentioned steps of the method of the present invention can be implemented as a program and can be stored in a computer readable recording medium such as CD-ROM, RAM, ROM, floppy disk, hard disk and magneto-optical disk.

The present invention, as mentioned above, transmits a preamble (or a pilot), which is direct sequence spread to a new frequency for a short time by using an uplink compressed mode or a similar method to the uplink compressed mode before a mobile station completely disconnects a currently established communication in an inter-frequency hard handover situation described in FIG. 1. As a result, the present invention makes the seamless inter-frequency hard handover possible by allowing the target base station to acquire the uplink synchronization before the mobile station completely disconnects the currently established communication. Furthermore, in case that the base station controller 4 does not know the frame offset, which is a difference between the SFN of the target base station and the CFN of the mobile station, the present invention can prevent a call disconnection by forcing the network to know the frame offset by using an AI, which is transmitted through a downlink by using a new frequency from the target base station, just before performing the hard handover.

While the present invention has been described with respect to certain preferred embodiments, it will be apparent to those skilled in the art that various changes and modifications may be made without departing from the scope of the invention as defined in the following claims.

The invention claimed is:

1. A method for performing seamless inter-frequency hard handover in a radio communication system, comprising the steps of:
   a) at a mobile station, disconnecting a first uplink carrier frequency used for communication with a source base station, transmitting a direct sequence spread preamble signal through a second uplink carrier frequency for a short time after receiving a first instruction from a base station controller, and continuously performing the communication through the first uplink carrier frequency, wherein the first instruction includes a transport channel frame number (TGCFN) at which the mobile station starts an uplink preamble transmission, a slot number (TGSN), and compressed mode parameters;
   b) at a target base station, acquiring an uplink synchronization of the mobile station by using the direct sequence spread preamble after receiving a second instruction from the base station controller, wherein the second instruction includes the TGCFN, the TGSN, the compressed mode parameters, and a scrambling code identification (SCID), thereby allowing the target base station to search the preamble transmitted from the mobile station in a preset time; and c) at the base station controller, after the preamble transmission, transmitting a connection frame number (CFN) of the mobile station to the source base station, the mobile station, and the target base station to instruct performing the hard handover by using the uplink synchronization and establishing communication between the mobile station and the target base station through a new link at the CFN of the mobile station.

2. The method as recited in claim 1, further comprising the steps of:

d) at the target base station, after acquiring the uplink synchronization of the preamble, transmitting an acquisition indicator as an acknowledgment of the acquisition of the uplink synchronization by using a new downlink frequency; and e) at the mobile station, detecting the acquisition indicator.

3. The method as recited in claim 2, further comprising the step of f) re-transmitting the preamble by increasing a transmission power if the mobile station does not receive the acquisition indicator from the target base station.

4. The method as recited in claim 2, further comprising the step of f) in case the base station controller does not know a frame offset, which is a difference between the connection frame number (CFN) of the mobile station and a system frame number (SFN) of the target base station, calculating the frame offset by using the SEN used for transmitting the acquisition indicator and the CFN used for receiving the acquisition indicator, which are transmitted from the target base station and the mobile station, respectively, and transmitting the calculated frame offset to the target base station.

5. The method as recited in claim 4, wherein the step a) includes the steps of:

a1) for making the base station controller know the frame offset just before instructing the mobile station and the target base station to perform the handover, at the base station controller, transmitting the transport channel frame number (TGCFN), the slot number (TGSN), the compressed mode parameters, TGL1, TGL2, TGD, TGPL1, TGPL2 and TGPRC, and an orthogonal variable spreading factor (OVSF) code information to be used as a channel spread code of the acquisition indicator through a new downlink to the mobile station after a time0, at which, the mobile station is communicating with a source base station through the first carrier frequency and acquires the synchronization of the new downlink, the target base station has resources to support the mobile station but has not acquired the uplink synchronization and the base station controller knows a chip offset but does not know the frame offset; and a2) at the mobile station, transmitting the preamble during a transmission gap (TG) of a corresponding compressed frame through the second uplink carrier frequency by using compressed mode information, the step b) including the steps of:

b1) at the base station controller, transmitting TGCFN, the TGSN, the compressed mode parameters TGL1, TGL2, TGD, TGPL1, TGPL2 and TGPRC, the scrambling code identification (SCID) and a chip offset to the target base station;

b2) at the target base station, searching the preamble in each frame by using the compressed mode information, the chip offset and the SCID from directly after the target base station receives a preamble search instruction from the base station controller;

b3) at the target base station, after achieving the preamble searching, transmitting an acquisition indicator spread by the OVSF through the new downlink as a response of the success of searching the preamble search to the mobile station;

b4) at the target base station, reporting an SEN of the target base station, which transmits the acquisition indicator, to the base station controller; and b5) at the mobile station, reporting the CFN of the mobile station, at which the acquisition indicator is detected, to the target base station after succeeding to detect the acquisition indicator and stopping transmitting the preamble, and the step c) including the steps of:

c1) at the base station controller, instructing the source base station and the mobile station to perform the handover and at the same time, transmitting the connection frame number (CFN) of the mobile station, at which the handover is performed, and information for an uplink transmission power, which is used by the mobile station just after the handover is performed;

c2) at the base station controller, instructing the target station to perform the handover and, at the same time, transmitting the CFN of the mobile station, at which the handover is performed, and the frame offset to the target base station; and c3) at the mobile station and the target base station, establishing communication there between through the new link at the CFN, wherein the OVSF code, which is used for transmitting the acquisition indicator, is used for a communication channel of the new downlink.

6. The method as recited in claim 2, wherein, if the mobile station employs a single-mode receiver, a last frame of the first carrier frequency for the communication established between the mobile station and a source base station and a first frame after the preamble is transmitted to the target base station are operated as compressed frames and, between the two frames, there is a guard time for a frequency conversion of the mobile station.

7. The method as recited in claim 1, further comprising the step of d) in case the base station controller knows a frame offset, the target base station, acquiring the uplink synchronization by using the preamble and reporting the acquisition of the uplink synchronization only to the base station controller.

8. The method as recited in claim 7, wherein the step a) includes the steps of:

a1) at the base station controller, transmitting a transport channel frame number (TGCFN), the slot number (TGSN) and the compressed mode parameters, TGL1, TGL2, TGD, TGPL1, TGPL2 and TGPRC, to the mobile station after a time0 at which the mobile station is communicating with the source base station through the first carrier frequency and acquires the synchronization of a new downlink, the target base station has resources to support the mobile station but has not acquired the uplink synchronization and the base station controller knows the frame offset and a chip offset; and a2) at the mobile station, transmitting the preamble during a transmission gap (TG) of a corresponding compressed frame through the second uplink carrier frequency by using compressed mode information, the step b) including the steps of:

b1) at the base station controller, transmitting the TGCFN, the TGSN, the compressed mode parameters, TGL1, TGL2, TGD, TGPL1, TGPL2 and TGPRC, the scrambling code identification (SCID), the frame offset and the chip offset to the target base station;

b2) at the target base station, searching the preamble by using the compressed mode information, the frame offset, the chip offset and the SCID; and b3) at the target base station, after achieving the preamble searching, reporting the success of searching the preamble to the base station controller by the target base station, and the step c) including the steps of:

c1) at the base station controller, instructing the source base station and the mobile station to perform the handover and at the same time, transmitting orthogonal variable spreading factor (OVSF) information, which is used for establishing the new link, the connection frame number (CFN), of the mobile station, at which the handover is performed, and information for an uplink transmission power, which is used by the mobile station just after the handover is performed;

c2) at the base station controller, instructing the target base station to perform the handover and at the same time, transmitting the CFN at which the handover is performed; and c3) at the mobile station and the target base station, establishing communication there between through the new link at the CFN.

9. The method as recited in claim 1, further comprising the step of d) in case the base station controller knows a frame offset, at the target base station, transmitting an acquisition indicator through a new downlink of the second carrier frequency after acquiring the uplink synchronization by using the preamble and reporting the acquisition of the uplink synchronization to the base station controller.

10. The method as recited in claim 9, wherein the step a) includes the steps of:

a1) at the base station controller, transmitting the transport channel frame number (TGCFN), the slot number (TGSN), the compressed mode parameters, TGL1, TGL2, TGD, TGPL1, TGPL2 and TGPRC, and orthogonal variable spreading factor (OVSF) code information to be used as a channel spread code of the acquisition indicator through the new downlink to the mobile station after a time0 at which the mobile station is communicating with a source base station through the first carrier frequency and acquires the synchronization of the new downlink, the target base station has resources to support the mobile station but has not acquired the uplink synchronization and the base station controller knows the frame offset and a chip offset; and a2) at the mobile station, transmitting the preamble during a transmission gap (TG) of a corresponding compressed frame through the second uplink carrier frequency by using compressed mode information, the step b) including the steps of:

b1) at the base station controller, transmitting the TGCFN, the TGSN, the compressed mode parameters, TGL1, TGL2, TGD, TGPL1, TGPL2 and TGPRC, the scrambling code identification (SCID), the frame offset and the chip offset to the target base station;

b2) at the target base station, searching the preamble by using the compressed mode information, the frame offset, the chip offset and the SCID;

b3) at the target base station, after achieving the preamble searching, transmitting an acquisition indicator spread to the OVSF through the new downlink as a response of the success of searching the preamble; and b4) at the target base station, after achieving the preamble searching, reporting the success of searching the preamble to the base station controller, and the step c) including the steps of:

c1) at the base station controller, instructing the source base station and the mobile station to perform the handover and at the same time, transmitting the connection frame number (CFN) of the mobile station, at which the handover is performed, and information for an uplink transmission power, which is used by the mobile station just after the handover is performed;

c2) at the base station controller, instructing the target station to perform handover and at the same time, transmitting the CFN at which the handover is performed; and c3) at the mobile station and the target base station, establishing communication there between through the new link at the CFN, wherein the OVSF code, which is used for transmitting the acquisition indicator, is used for a communication channel of the new downlink.

11. A method for performing a seamless inter-frequency hard handover in a radio communication system in case that a base station controller (or a radio network) does not know a frame offset, which is a difference between a connection frame number (CFN) of a mobile station and a system frame number (SFN) of a target base station, comprising the steps of:

a) at the mobile station, completely disconnecting a first uplink carrier frequency used for communication, transmitting a direct sequence spread preamble (or pilot) through a second uplink carrier frequency for a short time, and continuously performing the communication through the first uplink carrier frequency;

b) at the target base station, acquiring an uplink synchronization of the mobile station by using the preamble before performing the hard handover;

c) at the target base station, after acquiring the uplink synchronization, transmitting a direct sequence spread acquisition indicator as a response for the acquisition of the uplink synchronization for a short time through a new downlink frequency;

d) at the mobile station, detecting the acquisition indicator;

e) at the base station controller, calculating a frame offset by using the SFN, which is used for transmitting the acquisition indicator and the CFN, which is used for receiving the acquisition indicator, and transmitting the calculated frame offset to the target base station; and f) at the base station controller, instructing the mobile station and the target base station to perform the handover, wherein the occurrence of a false handover instruction by the base station controller is minimized by classifying the acquisition indicator to a first acquisition indicator ($AI_1$) and a second acquisition indicator ($AI_2$), and the preamble to a first preamble ($preamble_1$) and a second preamble ($preamble_2$) for decreasing the false detection probability of the target base station and the mobile station in case the base station controller does not know the frame offset.

12. The method as recited in claim 11, wherein the method uses an orthogonal variable spreading factor (OVSF) code, which is used in a communication channel of the downlink when hard handover is performed through a new link, as a channel spreading code of the acquisition indicator in case that the target base station transmits the acquisition indicator as the response for the acquisition of the uplink synchronization through the new downlink frequency.

13. The method as recited in claim 12, wherein the target base station transmits the acquisition indicator at least more than one time to increase the probability of detecting the acquisition indicator of the mobile station.

14. The method as recited in claim 11, wherein the mobile station uses an uplink compressed mode pattern for the inter-frequency hard handover.

15. The method as recited in claim 14, wherein the mobile station uses a scrambling code operating in a normal mode when transmitting the preamble while using the uplink compressed mode pattern for the inter-frequency hard handover.

16. The method as recited in claim 11, wherein the $AI_1$ and $AI_2$ are distinguished with each other according to a binary orthogonal transform method using an orthogonal code.

17. The method as recited in claim 11, wherein the $preamble_1$ and the $preamble_2$ use an identical scrambling code, and are distinguished with each other according to a binary orthogonal transform method using a orthogonal code.

18. The method as recited in claim 11, wherein the mobile station performs a coherent demodulation to detect the acquisition indicator by using a common pilot channel (CPICH) transmitted through the frequency through which the acquisition indicator is transmitted.

19. The method as recited in claim 11, wherein the target base station stores signals received during a transmission gap (TG) of a compressed mode, at which the mobile station transmits the preamble, and then searches the preamble by using signals stored in a time, which the mobile station does not transmit the preamble.

20. The method as recited in claim 11, wherein the step c) includes the steps of:
  c1) at the target base station, transmitting the first acquisition indicator ($AI_1$) the mobile station through the new downlink frequency as a response for the success of searching the first preamble;
  c2) at the target base station, detecting the second preamble ($preamble_2$) in a next compressed frame after transmitting the first acquisition indicator ($AI_1$);
  c3) at the target base station, transmitting the second acquisition indicator ($AI_2$) to the mobile station when detecting the second preamble ($preamble_2$), reporting a success of acquiring the uplink synchronization to the base station controller and at the same time of noticing a SFN at which the second acquisition indicator ($AI_2$) is transmitted; and
  c4) at the target base station, detecting the first preamble again when it failed to detect the second preamble ($preamble_2$),
the step d) including the steps of:
  d1) at the mobile station, transmitting the second preamble ($preamble_2$) in the next compressed frame with the same power as used before when succeeding to detect the first acquisition indicator ($AI_1$) and transmitting the first preamble ($preamble_1$) again when failing to detect the first acquisition indicator ($AI_1$);
  d2) at the mobile station, reporting the detection of the second acquisition indicator ($AI_2$) to the base station controller in case that the mobile station is success to detect the second acquisition indicator ($AI_2$) after transmitting the second preamble ($preamble_2$) and, at the same time, transmitting a CFN, at which the second acquisition indicator ($AI_2$) is detected to the base station controller; and
  d3) at the mobile station, reporting the failure of detecting the second acquisition indicator ($AI_2$) to the base station controller in case that the mobile station fails to detect the second acquisition indicator ($AI_2$), after transmitting the second preamble ($preamble_2$),
the step e) including the steps of:
  e1) at the base station controller, calculating the frame offset when it received the CFN and the SFN from the mobile station and the target base station, respectively;
  e2) at the base station controller, instructing a home base station and the mobile station to perform the handover and, at the same time, transmitting the CFN of the mobile station, which performs the handover, and information for an uplink transmission power to be used by the mobile station directly after performing the handover; and
  e3) at the base station controller, instructing the target base station to perform the handover and, at the same time, transmitting the frame offset and the CFN of the mobile station, which performs the handover, and
the step f) including the steps of:
  f1) establishing a new communication link between the mobile station and the target base station at the CFN, wherein a downlink of the new communication link uses an orthogonal variable spreading factor (OVSF) code, which is used in transmitting the acquisition indicator; and
  f2) repeating the steps C1) to e3) in case that the base station controller receives a message of failing to detect the $AI_2$ from the mobile station, does not receive the SFN for a certain time after receiving the CFN, does not receive the CFN for a preset time after receiving the SFN, or does not receive any information from the mobile station and the target base station until a predetermined time is expired.

21. A computer readable medium encoded with a computer program for executing seamless inter-frequency handover, said program comprising routines, that when executed,:
  a) a mobile station to disconnect a first uplink carrier frequency used for communication with a source base station, transmit a direct sequence spread preamble signal through a second uplink carrier frequency for a short time after receiving a first instruction from a base station controller, and continuously perform the communication through the first uplink carrier frequency, wherein the first instruction includes a transport channel frame number (TGCFN) at which the mobile station starts an uplink preamble transmission, a slot number (TGSN), and compressed mode parameters;
  b) a target base station to acquire an uplink synchronization of the mobile station by using the direct sequence spread preamble after receiving a second instruction from the base station controller, wherein the second instruction includes the TGCFN, the TGSN, the compressed mode parameters, and a scrambling code identification (SCID), thereby allowing the target base station to search the preamble transmitted from the mobile station in a preset time; and
  c) the base station controller, after the preamble transmission, to transmit a connection frame number (CFN) of the mobile station to the source base station, the mobile station, and the target base station to instruct performing the hard handover by using the uplink synchronization and establishing communication between the mobile station and the target base station through a new link at the CFN of the mobile station.

22. The computer readable medium as recited in claim 21, said program further comprising routines, that when executed, cause:
  d) the target base station, after acquiring the uplink synchronization of the preamble, to transmit an acquisition indicator as an acknowledgment of the acquisition of the uplink synchronization by using a new downlink frequency; and
  e) the mobile station to detect the acquisition indicator.

23. The computer readable medium as recited in claim 22, said program further comprising the routine for, when executed, f) re-transmitting the preamble by increasing a transmission power if the mobile station does not receive the acquisition indicator from the target base station.

24. The computer readable record medium as recited in claim 21, said program further comprising the routine for, when executed, d) forcing the base station controller to know a frame offset just before the base station controller (or a radio network) instructs the mobile station and the target base station to perform the handover in case that the base station controller does not know the frame offset, which is a difference between a connection frame number (CFN) of the mobile station and a system frame number (SFN) of the target base station, thereby preventing an additional call disconnection.

25. The computer readable record medium as recited in claim 21, said program further comprising the routine for, when executed, d) in case the base station controller knows a frame offset, the target base station, acquiring the uplink synchronization by using the preamble and reporting the acquisition of the uplink synchronization only to the base station controller.

26. The computer readable medium as recited in claim 21, said program further comprising the routine for, when executed, d) in case the base station controller knows a frame offset, the target base station, transmitting an acquisition indicator through a new downlink of the second carrier frequency after acquiring the uplink synchronization by using the preamble and reporting the acquisition of the uplink synchronization the base station controller.

* * * * *